(12) United States Patent
Alexander et al.

(10) Patent No.: US 12,600,363 B2
(45) Date of Patent: Apr. 14, 2026

(54) AWARENESS CHECKER FOR ENHANCING COLLABORATIVE DRIVING SUPERVISION

(71) Applicant: ARRIVER SOFTWARE LLC, Novi, MI (US)

(72) Inventors: Rachel Alexander, Chicago, IL (US); Shabin Mahadevan, Lake Orion, MI (US); Steffen Kuhn, Erlangen (DE)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/559,733

(22) Filed: Dec. 22, 2021

(65) Prior Publication Data
US 2023/0192100 A1      Jun. 22, 2023

(51) Int. Cl.
*B60W 40/09* (2012.01)
*B60W 50/14* (2020.01)
(Continued)

(52) U.S. Cl.
CPC ............ *B60W 40/09* (2013.01); *B60W 50/14* (2013.01); *B60W 60/0053* (2020.02);
(Continued)

(58) Field of Classification Search
None
See application file for complete search history.

(56) References Cited

U.S. PATENT DOCUMENTS

| | | | | |
|---|---|---|---|---|
| 10,241,509 | B1 * | 3/2019 | Fields | ..................... G06Q 40/08 |
| 10,647,333 | B1 * | 5/2020 | Donnelly | ............... B60K 35/26 |

(Continued)

FOREIGN PATENT DOCUMENTS

| | | |
|---|---|---|
| DE | 102015013319 A1 | 4/2017 |
| DE | 102020003018 A1 | 11/2021 |

(Continued)

OTHER PUBLICATIONS

International Search Report and Written Opinion—PCT/US2022/081290—ISA/EPO—Mar. 22, 2023.

*Primary Examiner* — David P. Merlino
(74) *Attorney, Agent, or Firm* — Polsinelli/Qualcomm

(57)      ABSTRACT

An apparatus includes an interface and a control circuit. The interface may be configured to (i) receive sensor-based information from a plurality of sensor signals from a vehicle platform of a vehicle and environmental information about an environment of the vehicle, and (ii) present one or more control signals to the vehicle platform. The control circuit may be configured to (i) detect whether an attention state of a driver is in an attentive state or an inattentive state in response to one or more of the plurality of sensor signals from the vehicle platform and a driver monitoring system, (ii) assess whether the driver is sufficiently attentive by monitoring the one or more of the plurality of sensor signals from the vehicle platform and the driver monitoring system, and (iii) maintain an awareness of the driver to the environment of the vehicle by proactively interacting with the driver to determine whether a perception of the driver of the environment of the vehicle corresponds with the environmental information and the sensor-based information received by the interface.

20 Claims, 10 Drawing Sheets

500i

(51) Int. Cl.
  *B60W 60/00* (2020.01)
  *G06V 20/56* (2022.01)
  *G06V 20/59* (2022.01)

(52) U.S. Cl.
  CPC ......... *B60W 60/0059* (2020.02); *G06V 20/56* (2022.01); *G06V 20/597* (2022.01); *B60W 2540/229* (2020.02); *B60W 2554/20* (2020.02); *B60W 2554/40* (2020.02)

(56) References Cited

U.S. PATENT DOCUMENTS

| | | | | |
|---|---|---|---|---|
| 11,188,074 | B1* | 11/2021 | Benavidez | G05D 1/0044 |
| 12,202,528 | B2* | 1/2025 | Oba | B60W 50/082 |
| 2010/0117814 | A1* | 5/2010 | Lermer | G08B 21/06 |
| | | | | 340/439 |
| 2013/0325478 | A1 | 12/2013 | Matsumoto et al. | |
| 2014/0091917 | A1 | 4/2014 | Pink et al. | |

| | | | | |
|---|---|---|---|---|
| 2016/0070101 | A1* | 3/2016 | Nishizawa | G09B 5/06 |
| | | | | 345/8 |
| 2016/0355190 | A1* | 12/2016 | Omi | G08B 21/06 |
| 2020/0062275 | A1* | 2/2020 | Higgins | G05D 1/0088 |
| 2020/0231182 | A1* | 7/2020 | Oba | G05D 1/0061 |
| 2020/0290567 | A1* | 9/2020 | Funyak | B60R 25/102 |
| 2020/0379460 | A1* | 12/2020 | Stent | G06V 10/82 |
| 2021/0094820 | A1* | 4/2021 | Donnelly | B60W 40/08 |
| 2021/0125521 | A1* | 4/2021 | Telpaz | H04N 7/188 |
| 2021/0155269 | A1* | 5/2021 | Oba | G08G 1/096775 |
| 2021/0188289 | A1* | 6/2021 | Oba | G08G 1/16 |
| 2022/0144307 | A1* | 5/2022 | Jung | B60W 60/0055 |
| 2023/0036776 | A1* | 2/2023 | Mussa | B60W 60/0051 |

FOREIGN PATENT DOCUMENTS

| | | | | | |
|---|---|---|---|---|---|
| EP | 2284057 | A2 * | 2/2011 | | B60W 30/12 |
| EP | 3910612 | A1 | 11/2021 | | |
| WO | 2021067380 | A1 | 4/2021 | | |

* cited by examiner

500a

DRIVER ACTIVATES THE FEATURE AND THE AWARENESS CHECKER ASSESSES THE DRIVER STATE

500b

THE DRIVER IS ATTENTIVE AND THE AWARENESS CHECKER SIGNALS THE VIRTUAL ASSISTANT TO REFLECT HAPPINESS

500g

500h

AWARENESS CHECKER FOR ENHANCING COLLABORATIVE DRIVING SUPERVISION

FIELD OF THE INVENTION

The invention relates to advanced driver assistance systems generally and, more particularly, to a method and/or apparatus for implementing an awareness checker for enhancing collaborative driving supervision.

BACKGROUND

Supervised advanced driver assistance systems (ADAS) cruising features (SAE L0 to L2+) are becoming more prevalent globally and are expected to become mainstream in the coming years. A common design level assumption for the safety case of the ADAS cruising features is that the driver is expected to be solely responsible for the safety of the driving task by monitoring the driving environment. However, as seen from similar features introduced in recent times, there is a wide disconnect between the design level assumption and real-world usage for a wide range of reasons. Some example reasons include: drivers often check out during the act of supervision; feature capability is overestimated (e.g., automation fallacy); features are unintentionally misused and/or intentionally abused; eyes ON road or hands ON steering do not necessarily equal mind ON driving; and there can be confusion over "who does what" (e.g., human vs. automation). The disengagement of drivers from driving supervision when using assisted driving features consequently has resulted in real world mishaps and unacceptable risks on the roads. Autopilot features believed to be safe are creating more distracted drivers. Drivers who regularly use collaborative driver assistance systems are almost twice as likely to drive distracted.

It would be desirable to implement an awareness checker for enhancing collaborative driving supervision.

SUMMARY

The invention concerns an apparatus comprising an interface and a control circuit. The interface may be configured to (i) receive sensor-based information from a plurality of sensor signals from a vehicle platform of a vehicle and environmental information about an environment of the vehicle, and (ii) present one or more control signals to the vehicle platform. The control circuit may be configured to (i) detect whether an attention state of a driver is in an attentive state or an inattentive state in response to one or more of the plurality of sensor signals from the vehicle platform and a driver monitoring system, (ii) assess whether the driver is sufficiently attentive by monitoring the one or more of the plurality of sensor signals from the vehicle platform and the driver monitoring system, and (iii) maintain an awareness of the driver to the environment of the vehicle by proactively interacting with the driver to determine whether a perception of the driver of the environment of the vehicle corresponds with the environmental information and the sensor-based information received by the interface.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
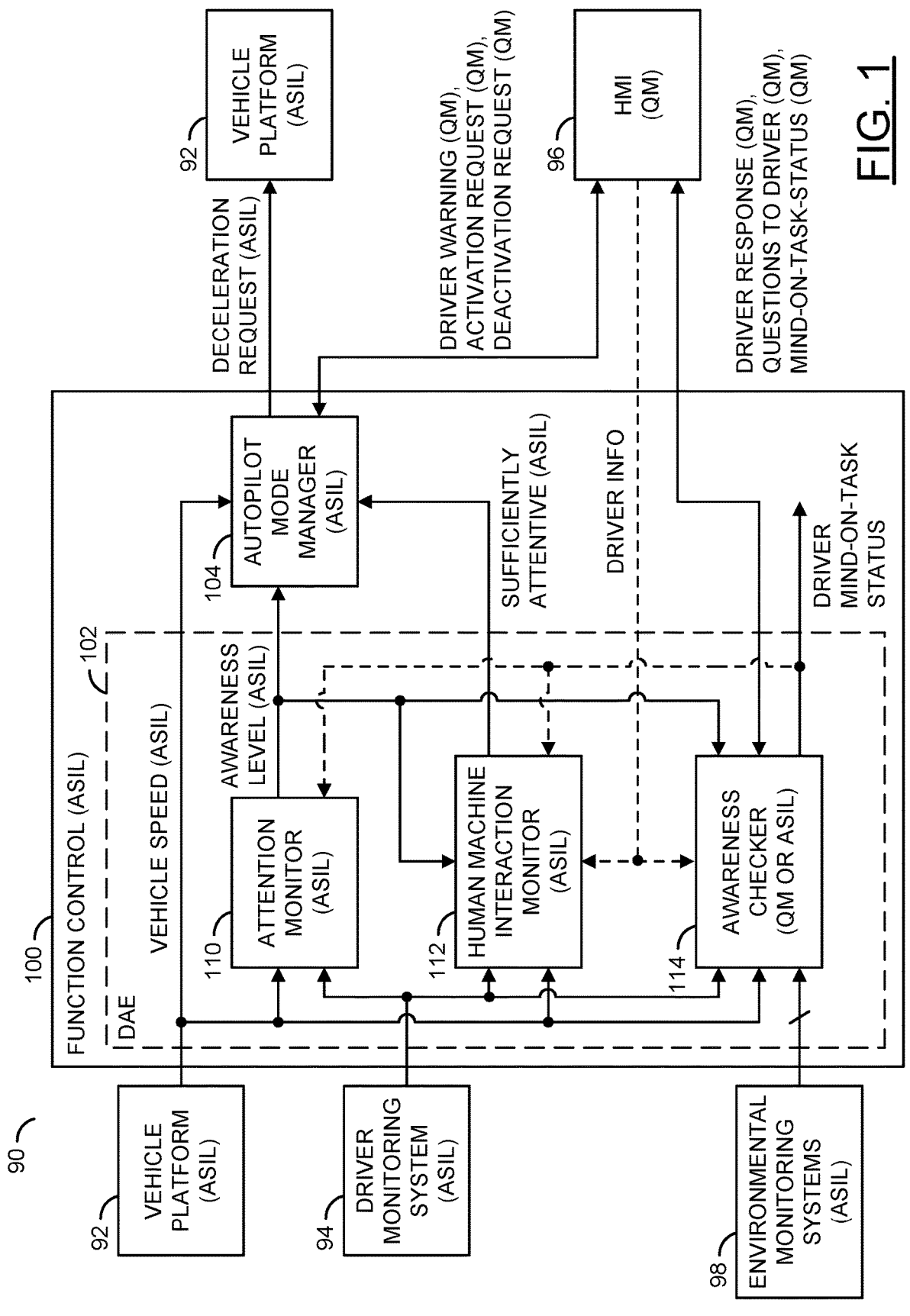
FIG. 1 is a diagram illustrating a system in accordance with an embodiment of the invention.

Embodiments of the present invention include providing an awareness checker for enhancing collaborative driving supervision that may (i) make the task of ADAS supervision more collaborative, (ii) proactively engage the driver instead of reactively escalating after distraction, (iii) focus on rewarding good engagement via collaboration (positive scale) over punishing bad supervising behavior (negative scale), (iv) nudge the driver to monitor the driving environment when the feature is active thereby reducing the possibly for non-driving related task involvement (NDRT), (v) employ an in-vehicle digital assistant as a user interface to explore the idea of interactive safety, (vi) enable human-autonomy collaboration via interaction and positive reinforcement, (vii) provide a three level monitoring for driver engagement detection during assisted driving, and/or (viii) be implemented as one or more integrated circuits.

There is an onus on collaborative driving features to make the supervision expectation on the driver clear and make sure the driver does not lose situational awareness. In various embodiments, the task of ADAS supervision is made more collaborative by proactively engaging the driver instead of reactively escalating responses after driver distraction is detected. In various embodiments, a system may be provided that focuses on rewarding good engagement via collaboration (positive scale) over punishing bad supervising behavior (negative scale). In an example, the feature control system may nudge the driver to monitor the driving environment when the feature is active thereby reducing the possibility for secondary, non-driving related task (NDRT) involvement.

In an example, a new component (e.g., hardware, software. or combination thereof) may be implemented. The new component is generally referred to as an awareness checker. In an example, the awareness checker may employ an in-vehicle digital assistant as a user interface to explore the idea of interactive safety (similar to level 3 in E-Gas three level monitoring below). The awareness checker generally enables human-autonomy collaboration via interaction and positive reinforcement.

In an example, the driver monitoring concept may be carried out in 3 levels. A first level (or Level 1) may be implemented similarly to existing systems (e.g., hyper traffic jam assistance (HTJA) attention monitor). A second level (e.g., Level 2) may be implemented similarly to a human machine interaction monitor (HMIM) disclosed in co-pending U.S. patent application Ser. No. 17/493,144, filed Oct. 4, 2021, which is herein incorporated by reference in its entirety. A third level (e.g., Level 3) may be implemented as an awareness checker (AC) to detect whether the driver has their mind on supervision of the autonomous feature. In an example, Level 1 may be designated as a function level, Level 2 may be designated as a function monitoring level, and Level 3 may be designated as a controller monitoring level.

In an example, Level 1 may contain the engine control functions (e.g., implementation of requested engine torque, component monitoring, and input/output variable diagnostic to control the system reactions if a fault is detected. In an example, Level 2 may detect the defective process of Level 1 functional software (e.g., by monitoring the calculated torque values or vehicle acceleration, etc.). In a case where a fault is detected, system reactions may be triggered. In an example, Level 3 may implement a monitoring module. The monitoring module may be an independent part of the function controller (e.g., ASIC or controller), which tests the correctly executed program during a question-answer process. Current systems in the market only offer a single level of engagement monitoring and are often susceptible to foreseeable misuse and abuse. In various embodiments, an industry first three level monitoring for driver engagement detection during assisted driving may be provided.

Referring to FIG. 1, a diagram is shown illustrating a system in accordance with an embodiment of the invention. In an example, a system (or apparatus) 90 may implement an advanced driver-assistance system (ADAS). In various embodiments, the system 90 may comprise a vehicle platform 92, a driver monitoring system (DMS) 94, a human machine (or vehicle) interface (HMI) 96, environmental monitoring systems (EMS) 98, and a function control module 100. In various embodiments, the vehicle platform 92, the driver monitoring system (DMS) 94, the environment monitoring systems (EMS) 98, and the function control module 100 may be implemented as Automotive Safety Integrity Level (ASIL), while the human machine interface (HMI) 96 may be implemented as Quality Management (QM).

Automotive Safety Integrity Level (ASIL) is a risk classification scheme defined by the ISO 26262—Functional Safety for Road Vehicles standard. This is an adaptation of the Safety Integrity Level (SIL) used in IEC 61508 for the automotive industry. The ASIL classification helps defining the safety requirements needed to be in line with the ISO 26262 standard to keep the risk to an acceptable level. The ASIL is established by performing a risk analysis of a potentially hazardous scenario by looking at the Severity, Exposure and Controllability of the vehicle operating scenario. The safety goal for that hazardous scenario in turn carries the ASIL requirements. The ASILs range from. ASIL D, representing the highest degree of risk of a hazardous scenario turning into a mishap and highest degree of rigor needed to be applied in the assurance of the resultant safety requirements, to QM, representing applications with no automotive hazardous scenarios with unacceptable risk and, therefore, no safety requirements to manage under the ISO 26262 safety processes. The level QM, referring to "Quality Management", means that risk associated with a hazardous event is not unreasonable and does not therefore require safety measures in accordance with ISO 26262. The intervening levels (ASIL C, ASIL B, and ASIL A) are simply a range of varying degrees of hazard risk levels and degrees of assurance and engineering rigor required.

The standard defines functional safety as "the absence of unreasonable risk due to hazards caused by malfunctioning behavior of electrical or electronic systems." ASILs establish safety requirements, based on the severity, probability and controllability of hazardous scenarios, for automotive components to be compliant with ISO 26262. Systems like airbags, anti-lock brakes, and power steering require an ASIL D grade-the highest rigor applied to safety assurance-because the risks associated with their failure are the highest. On the other end of the safety spectrum, components like wiper systems require only an ASIL A grade. Headlights and brake lights generally would be ASIL B, as would be rear lights due to risk of rear collisions, while automatic emergency brake systems would generally be ASIL C due to risks associated with the unintended deceleration.

In an example, the vehicle platform 92, the DMS 94, the HMI 96, and the EMS 98 may provide input signals to the function control module 100. In an example, the vehicle platform 92 may provide a number of input signals (e.g., VEHICLE SPEED, WINDOWS & DOORS LOCK STATUS, TIRE PRESSURE, HVAC STATUS, ETC.). The signal VEHICLE SPEED may communicate vehicle (longitudinal) speed to the function control module 100. The signal WINDOWS & DOORS LOCK STATUS may communicate whether windows are open or closed, and whether doors are open, closed, locked, or unlocked. The signal TIRE PRESSURE may communicate an inflation status (e.g., psi) of the tires of the vehicle. The signal HVAC STATUS may communicate whether an air conditioner (AC) or heater (HTR) are engaged, blower speed, passenger compartment temperature, etc. The DMS 94 may provide input signals communicating information related to driver awareness (e.g., driver eye movement, driver hand positions, steering angle, brake and accelerator pedal positions, etc.).

In an example, the HMI 96 may provide a first input signal (e.g., ACTIVATION REQUEST), a second input signal (e.g., DEACTIVATION REQUEST), and a third signal (e.g., DRIVER RESPONSE) to the function control module 100. The signal ACTIVATION REQUEST may communicate a request from the driver to activate an ADAS feature controlled by the function control module 100. The signal DEACTIVATION REQUEST may communicate a request from the driver to de-activate the ADAS feature controlled by the function control module 100. The signal DRIVER RESPONSE may communicate responses from the driver to queries presented (e.g., by an avatar or in-vehicle personal assistant) to the driver via the HMI 96. In some embodiments, the HMI 96 may optionally present an input signal (e.g., DRIVER INFO) communicating information about the particular driver operating the vehicle. In various embodiments, the signal VEHICLE SPEED may be implemented as ASIL, and the signals ACTIVATION REQUEST, DEACTIVATION REQUEST, and DRIVER RESPONSE may be implemented as QM.

In an example, the function control module 100 may provide output signals to the vehicle platform 92 and the HMI 96. In an example, the function control module 100 may present an output signal (e.g., DECELERATION REQUEST) to the vehicle platform 92. The signal DECELERATION REQUEST may be configured to allow the function control module 100 to bring the vehicle to a safe stop. In various embodiments, the signal DECELERATION REQUEST may be implemented as ASIL. The function control module 100 may also present a number of signals (e.g., DRIVER WARNING, QUESTIONS TO DRIVER, DRIVER MIND-ON-TASK STATUS, etc.) to the HMI 96. The signal DRIVER WARNING may communicate information to cause the HMI 96 to present a particular warning to the driver. The signal QUESTIONS TO DRIVER may communicate information to cause the HMI 96 to present a particular question to the driver. The signal DRIVER MIND-ON-TASK STATUS may communicate information to cause the HMI 96 to present a particular avatar state to the driver. In various embodiments, the signals DRIVER WARNING and QUESTIONS TO DRIVER may be implemented as QM. In various embodiments where the signal DRIVER MIND-ON-TASK STATUS is utilized only for proactively collaborating with the driver in the task of environmental monitoring and only indirectly assists the safety case, the signal DRIVER MIND-ON-TASK STATUS may be implemented as QM. In embodiments where the signal DRIVER MIND-ON-TASK STATUS is subscribed to by safety related elements of the function control module 100, the signal DRIVER MIND-ON-TASK STATUS may be implemented as ASIL.

In an example, the function control module 100 may comprise a block (or circuit) 102 and a block (or circuit) 104. The block 102 may be implemented as a driver awareness estimator (DAE). The block 104 may be implemented as an ADAS feature mode manager. In one example, the block 104 may be implemented as an autopilot mode manager. However, other autonomous features may be implemented accordingly. In various embodiments, the blocks 102 and 104 are generally implemented as ASIL. In an example, the signal VEHICLE SPEED may be presented to a first input of the block 102 and a first input of the block 104. The signals from the DMS 94 may be presented to a second input of the block 102. The signals from the HMI 96 may be presented to a third input of the block 102 and a second input of the block 104. The signals from the EMS 98 may be presented to a fourth input of the block 102. The block 102 may present a signal (e.g., AWARENESS LEVEL) to a third input of the block 104 and a signal (e.g., SUFFICIENTLY ATTENTIVE) to a fourth input of the block 104. The signals AWARENESS LEVEL and SUFFICIENTLY ATTENTIVE may be implemented as ASIL. In embodiments where the HMI 96 provides the signal DRIVER INFO to the function control module 100, the signal DRIVER INFO may be presented to a fifth input of the block 102. The signal DRIVER INFO may be implemented as QM.

In various embodiments, the block 102 may be configured as a driver awareness estimator (DAE) to methodically detect whether a driver is attentive and reach an appropriate safe state when the driver is no longer attentive. In an example, the driver awareness estimator 102 may (i) provide a driver awareness level escalation regime that generates warnings at a number (e.g., 3) of different levels via the HMI 96, (ii) detect insufficient attention related to short term shared visual attention (e.g., from involvement in secondary or non-driving related tasks), (iii) proactively engage the driver instead of reactively escalating after distraction, and (iv) nudge the driver to monitor the driving environment when the automation feature is active thereby reducing the possibility for non-driving related task (NDRT) involvement.

In an example, the driver awareness estimator 102 may comprise a block (or circuit) 110, a block (or circuit) 112, and a block (or circuit) 114. The block 110 may be implemented as an attention (or awareness) monitor. The block 112 may be implemented as a human machine interaction monitor (HMIM). The block 114 may be implemented as an awareness checker (AC). In various embodiments, the blocks 110 and 112 are generally implemented as ASIL. In various embodiments where the signal DRIVER MIND-ON-TASK STATUS is utilized only for proactively collaborating with the driver in the task of environmental monitoring and only indirectly assists the safety case, the block 114 may be implemented as QM. In embodiments where the signal DRIVER MIND-ON-TASK STATUS is subscribed to by safety related elements of the function control module 100 (e.g., the block 110, the block 112, etc.), the block 114 may be implemented as ASIL.

In an example, the signal VEHICLE SPEED may be presented to a first input of the block 110, a first input of the block 112, and a first input of the block 114. The signals from the DMS 94 may be presented to a second input of the block 110, a second input of the block 112, and a second input of the block 114. The signals from the HMI 96 may be presented to a third input of the block 114. The signals from the EMS 98 may be presented to a fourth input of the block 114. The block 110 may present the signal AWARENESS LEVEL to a third input of the block 112 and a fifth input of the block 114. The signal AWARENESS LEVEL may be implemented as ASIL. The block 112 may present the signal SUFFICIENTLY ATTENTIVE to the third input of the block 104. The signal SUFFICIENTLY ATTENTIVE may be implemented as ASIL. The block 114 may present a signal (e.g., DRIVER MIND-ON-TASK STATUS) as an output signal. In an example, the signal DRIVER MIND-ON-TASK STATUS may communicate a determination by the block 114 of an awareness level of the driver to the external and internal environments of the vehicle. In an example, the signal MIND-ON-TASK STATUS may be stored in a local memory for use by other modules of the function control module 100.

In various embodiments where the signal DRIVER MIND-ON-TASK STATUS is utilized only for proactively collaborating with the driver in the task of environmental monitoring and only indirectly assists the safety case, the signal DRIVER MIND-ON-TASK STATUS may be implemented as QM. In embodiments where the signal DRIVER MIND-ON-TASK STATUS is subscribed to by the block 110 and/or the block 112, the signal DRIVER MIND-ON-TASK STATUS may be implemented as ASIL. In embodiments where the HMI 96 provides the signal DRIVER INFO to the function control module 100, the signal DRIVER INFO may be presented to a fifth input of the block 112 and a sixth input of the block 114. The signal DRIVER INFO may be implemented as QM.

In various embodiments, the block 110, the block 112, and the block 114 may be configured as a driver awareness estimator (DAE) to methodically detect whether a driver is attentive and, when the driver is no longer attentive, reach an appropriate safe state. In an example, the attention monitor 110 may provide a driver awareness level escalation regime that generates warnings at a number (e.g., 3) of different levels via the HMI 96 and may detect insufficient attention related to short term shared visual attention (e.g., from involvement in secondary tasks). The attention monitor 110 may be implemented similarly to existing production attention tracking features on the market today that employ algorithms to track and categorize visual attention of drivers.

In various embodiments, the driver awareness estimator (DAE) 102 does not rely solely on the attention monitor 110 to keep the driver functionally vigilant (and thereby meet a safety goal) due to numerous human factors related challenges in keeping the driver engaged in the driving task. In various embodiments, the driver awareness estimator (DAE) 102 may account for foreseeable misuse and the types of abuse of similar features that have been documented in the market today. For example, misuse can result in edge cases where the attention monitor 110 labels the driver as fully aware thereby keeping an automation feature controlled by the function control module 100 active while the driver cannot intervene in case of any hazardous event. Hence, the driver awareness estimator (DAE) 102 in accordance with an embodiment of the invention generally utilizes the HMIM 112 and the AC 114 to provide additional functionality to methodically detect a driver who is no longer sufficiently attentive to act as a safety net for the attention monitor 110.

The HMIM 112 is generally configured to detect insufficient attention when the HMI 96 is not working or there is driver misuse. In an example, the HMIM 112 may look at an off-road glance distribution pattern of the driver by analyzing the toggle behavior between awareness levels reported by attention monitor 110 over a longer duration of time than the duration (or window) of time used by the attention monitor 110. In some embodiments, the HMIM 112 may also look at the awareness of the driver to a surrounding environment of the vehicle by subscribing to and analyzing the signal DRIVER MIND-ON-TASK STATUS reported by awareness checker 114. In various embodiments, long-term glance distribution patterns and driver mind-on-task status may be used to affect the kinesthetics and longitudinal control of the vehicle platform 92.

In an example, the HMIM 112 may focus on a longer-term assessment based on toggle behavior between attentiveness states reported by the attention monitor 110. By monitoring the awareness level of the driver (e.g., as captured by the time-distribution of the awareness states) in a given time window, a tunable (or programmable) number of transitions and an acceptable total time within each state of awareness may be defined. Using assisted driving (e.g., adaptive cruise control (ACC), etc.) glance behavior as the gold standard, driver engagement may be calculated based on the glance distribution patterns. In embodiments where the HMIM 112 also subscribes to the signal DRIVER MIND-ON-TASK STATUS, the HMIM 112 may be configured to take into account transitions between different states of the signal DRIVER MIND-ON-TASK STATUS when calculating (or assessing) driver engagement. The HMIM 112 generally prevents the driver from repeatedly entering into lower awareness states over a longer duration of time that may affect driver controllability by assessing the longer-term glance patterns and/or the mind-on-task status of the driver, and then triggering a transfer of control to the driver and a transition of the vehicle to a safe state (e.g., via the signal DECELERATION REQUEST, etc.). In an example, the HMIM 112 may be implemented similarly to a human machine interaction monitor (HMIM) disclosed in co-pending U.S. patent application Ser. No. 17/493,144, filed Oct. 4, 2021, which is herein incorporated by reference in its entirety.

The AC 114 may be implemented as part of the driver awareness estimator (DAE) 102 for evaluating driver attentiveness. In an example when supervised highway automation is active, the DAE 102 may monitor the driver attention level (e.g. via the attention monitor 110) using eyes-on-road information provided by the driver monitoring camera inside the cabin. Based on the eyes-on-road information, the driver awareness level may be categorized into four different states: aware, temporarily unaware, unaware, and out of the loop. In an example, right after the driver is evaluated as being aware, the AC 114 may be configured to proactively maintain the driver in a continuously aware state (e.g., using positive reinforcement or reward techniques).

In an example, maintaining the driver in the aware state may be accomplished by asking questions about the external world in proximity of the vehicle as perceived by environmental sensors and/or the status of the vehicle inside the cabin as perceived by in-cabin sensors. The specific contents of the questions may change dynamically based on the available information at hand for the AC 114 (e.g., from the vehicle platform 92 and the environmental monitoring systems 98). For example, the AC 114 cannot ask about a weather condition unless the AC 114 is aware of the current weather status (e.g., from the internet, or cameras with a view of the exterior of the vehicle, etc.). If the vehicle is lacking connection to the internet, the AC 114 may ask questions related to roadside objects or traffic signs, which may be validated against the information provided by perception or localization modules of the feature control module 100. In an example, based on the responses by the driver, the driver mind-on-task status may be categorized into three different states: happy (or unconcerned), concerned, and cautious.

Figure 2:
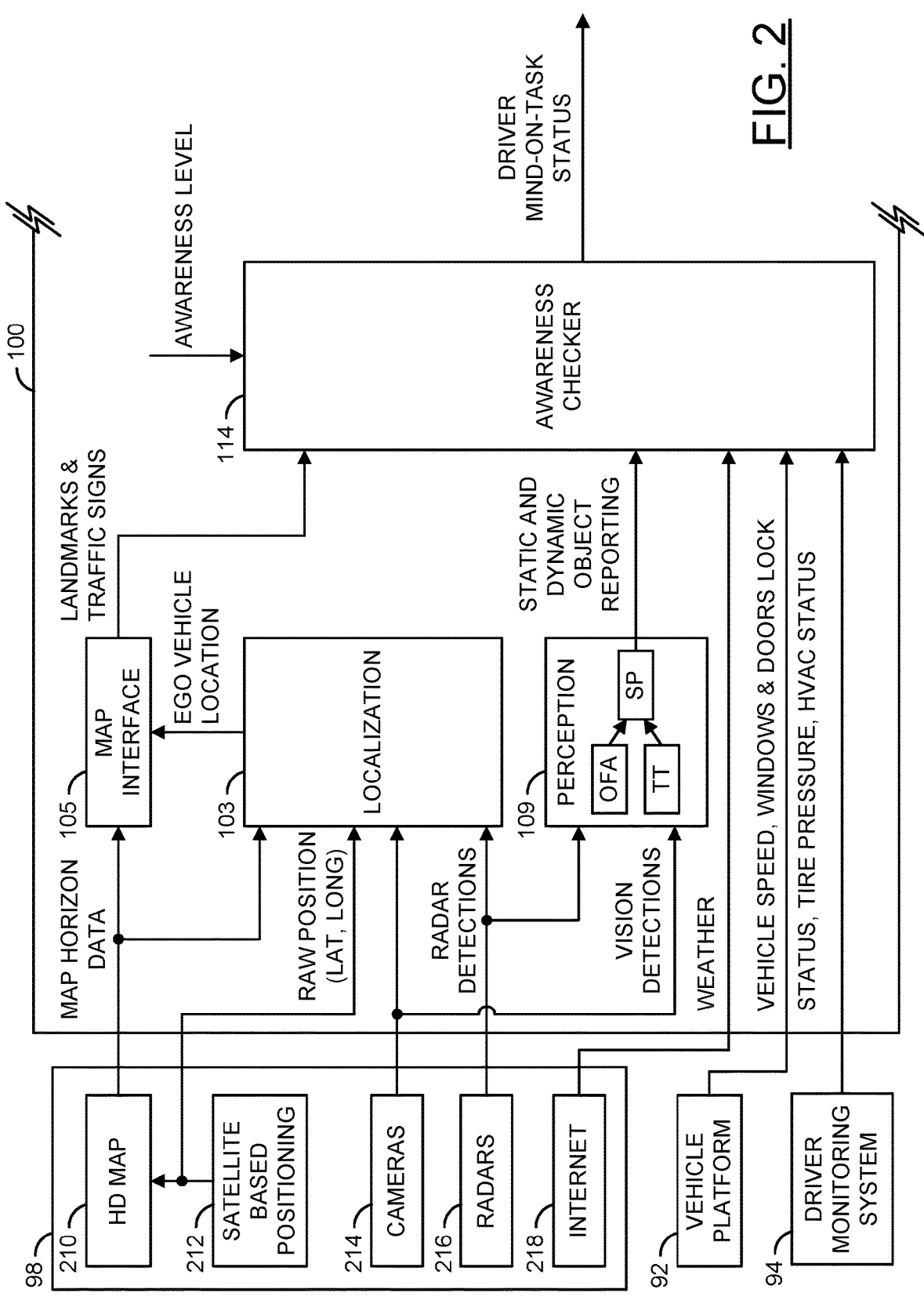
FIG. 2 is a diagram illustrating an example implementation of an environmental monitoring systems block of FIG. 1.

Referring to FIG. 2, a diagram is shown illustrating an implementation of environmental monitoring systems of an advanced driver-assistance systems (ADAS) feature control including an awareness checker in accordance with an example embodiment of the present invention. In an example, the function control module 100 may further comprise a localization circuit 103, a map interface 105, and a perception circuit 109. In an example, the environmental monitoring systems 98 may comprise a block (or circuit) 210, a block (or circuit) 212, a block (or circuit) 214, a block (or circuit) 216, and a block (or circuit) 218. The circuit 210 may implement a high-definition (HD) digital map. The circuit 212 may implement satellite-based positioning. In an example, the circuit 212 may comprise a global positioning system (GPS) or global navigation satellite system (GNSS) receiver. The circuit 212 may be configured to determined a position of a vehicle based on satellite signals received. The circuit 214 may implement a number of cameras (e.g., a forward looking camera, a rear looking camera, a number of corner viewing cameras, a number of side viewing cameras, etc.). The circuit 216 may implement a number of radar sensors (e.g., forward looking radar, corner and/or side looking radar, rear looking radar, etc.). The circuit 218 may implement a wireless communication interface. The circuit 218 may be configured to obtain weather information (e.g., from the internet).

The circuit 210 may have an input that may receive raw position information (e.g., latitude, longitude, etc.) from the satellite-based positioning circuit 212. In response to the raw position data, the circuit 210 may be configured to present map horizon data to an input of the localization circuit 103 and an input of the map interface circuit 105. The circuit 212 may be configured to also present the raw position data to the localization circuit 103. The localization circuit 103 may be configured to present vehicle location information to the map interface circuit 105. The map interface circuit 105 may be configured to generate map-based environmental information (e.g., landmark and traffic signs information) in response to the map horizon data received from the HD map 210 and the vehicle location information received from the localization circuit 103. The map interface circuit 105 may be configured to present the map-based environmental information to an input of the awareness checker 114.

The circuit 214 may comprise a number of on-board cameras including, but not limited to, a forward looking camera (FLC) 220. The forward looking camera (FLC) 220 may present one or more signals (e.g., VISION DETECTIONS) communicating vision detections to an input of the localization module (or circuit) 103 and an input of the perception module (or circuit) 109. The circuit 216 may include, but is not limited to, front corner/side radars (FCR & FSR or FCSR) 222 and forward looking radar (FLR) 224. The circuit 216 may present one or more signals (e.g., RADAR DETECTIONS) communicating radar detections to an input of the circuit 103 and an input of the circuit 109. In an example, the front corner/side radars (FCSR) 222 may present a first portion of the signal RADAR DETECTIONS communicating radar detections to an input of the circuit 103, and the forward looking radar (FLR) 224 may present a second portion of the signal RADAR DETECTIONS communicating radar detections to a second input of the perception module 109. The localization circuit 103 may be configured to generate the vehicle location information presented to the map interface 105 in response to the raw position data received from the satellite-based positioning circuit 212, the map horizon data received from the HD map 210, the vision detections received from the FLC 220, and the radar detections received from the FCSR 222.

The perception module 109 may be configured to generate signals communicating static and dynamic object reporting in response to the vision detections from the forward looking camera (FLC) 220 and the radar detections from the forward looking radar (FLR) 224. The static and dynamic object reporting signals generated by the perception module 109 may be presented to an input of the awareness checker 114.

In an example, the perception module 109 may be implemented as a software component. In an example, the perception module 109 may be utilized in a SAE L2+ automation feature such as Hyper Traffic Jam Assistance (HTJA). In various embodiments, the perception module 109 may utilize image data from the FLC 220 and point cloud data from a number of FCSRs 222a-222b and the FLR 224 to (i) detect the presence of landmarks, traffic signs and lights, pedestrians, and other objects, and (ii) analyze oncoming traffic, which may be further utilized by the awareness checker 114 to determine the awareness status of the driver (e.g., as subjects of questions presented to the driver). The perception module 109 generally performs sensor fusion of the on-board sensors. The perception module 109 generally fuses the image data from the FLC 220 and the point cloud data from the FCSRs 222a-222b and FLR 224 to (i) detect the presence of landmarks, traffic signs and lights, pedestrians, and other objects, (ii) track objects (or targets) in the environment around the vehicle, and (iii) analyze oncoming traffic.

In an example, the perception module 109 may detect objects in the surrounding environment of the vehicle based on the on-board sensor data. In an example, the objects detected by the perception module 109 may be used as a cross-check on objects identified in the map data. For example, the map data may describe roadways and segments thereof and may also describe buildings and other items or objects (e.g., lampposts, crosswalks, curbs, etc.), location and directions of traffic lanes or lane segments (e.g., the location and direction of a parking lane, a turning lane, a bicycle lane, or other lanes within a particular roadway), traffic control data (e.g., the location and instructions of signage, traffic lights, or other traffic control devices), and/or any other map data that provides information to assist the ADAS system 90 in comprehending and perceiving the surrounding environment of the vehicle.

In an example, the perception module 109 may be configured to determines a state for one or more of the objects in the surrounding environment of the vehicle. In an example, the state generally describes a current state (or features) of the one or more objects. In an example, the state for each object may describe an estimate of a current location (or position) of each object, a current speed (or velocity) of each object, a current acceleration of each object, a current heading of each object, a current orientation of each object, a size/shape/footprint (e.g., as represented by a bounding shape such as a bounding polygon or polyhedron) of each object, a type/class (e.g., vehicle, pedestrian, bicycle, etc.), a yaw rate of each object, a distance from the vehicle of each object, a minimum path to interaction of each object with the vehicle, a minimum time duration to interaction of each object with the vehicle, and/or other state information. In another example, the perception module 109 may also be configured to detect object free areas (e.g., as represented by a bounding shape such as a bounding polygon or polyhedron). In another example, the perception module 109 may be configured to update state information for each object over time. Thus, the perception module 109 may detect and track objects, such as other vehicles, that are near the ego vehicle over time.

In an example, the perception module 109 may comprise a number of modules including, but not limited to, an object free area (OFA) module (or circuit), a target tracking (TT) module (or circuit), and a static perception (SP) module (or circuit). In another example, the perception module 109 may also comprise road estimation and electronic horizon reconstruction modules (not shown), which may be used to produce self-generated map information from the on-board sensor-based information. In an example, the object free area module may be configured to detect object free areas. In an example, the object free area module may have a polygon output that may present a bounding shape such as a bounding polygon or polyhedron representing each object free area. In an example, the target tracking module may be configured to detect and track objects, such as other vehicles, that are near the ego vehicle over time. The target tracking module may have an output that may present a target tracking output. In an example, the polygon output of the OFA module and the target tracking output of the target tracking module may be presented to inputs of the static perception module. The static perception module my be configured to generate the static and dynamic object reporting signals that are presented to the awareness checker 114 in response to the polygon output received from the OFA module and the target tracking output received from the target tracking module.

For motion assessment, the static perception module may use object information from the target tracking output of the target tracking module combined with analysis of the object free area (OFA) polygon output of the OFA module in order to provide the direction of the traffic and a confidence of the detection. For detecting landmarks, traffic signs and lights, pedestrians, and other objects, the static perception module generally utilizes the object information from the target tracking output combined with analysis of the OFA polygon output to provide intersection type, object type, object location, landmark location, and intersection/object/landmark confidence.

The awareness checker 114 may be configured to generate the signal DRIVER MIND-ON-TASK STATUS based upon the static and dynamic object reporting signals received from a static perception module of the perception module 109, the landmark and traffic signs information received from the map interface 105, the weather information received from the circuit 218, the driver awareness level received from the awareness monitor 110, and the signals received from the vehicle platform 92. The awareness checker 114 may be configured to store the signal DRIVER MIND-ON-TASK STATUS for use by other modules of the function control module 100. In one example, the attention monitor 110 may subscribe to the signal DRIVER MIND-ON-TASK STATUS for use in determining whether to escalate the awareness level of the driver. In another example, the HMIM 112 may subscribe to the signal DRIVER MIND-ON-TASK STATUS for use in determining whether the driver is sufficiently attentive.

Figure 3:
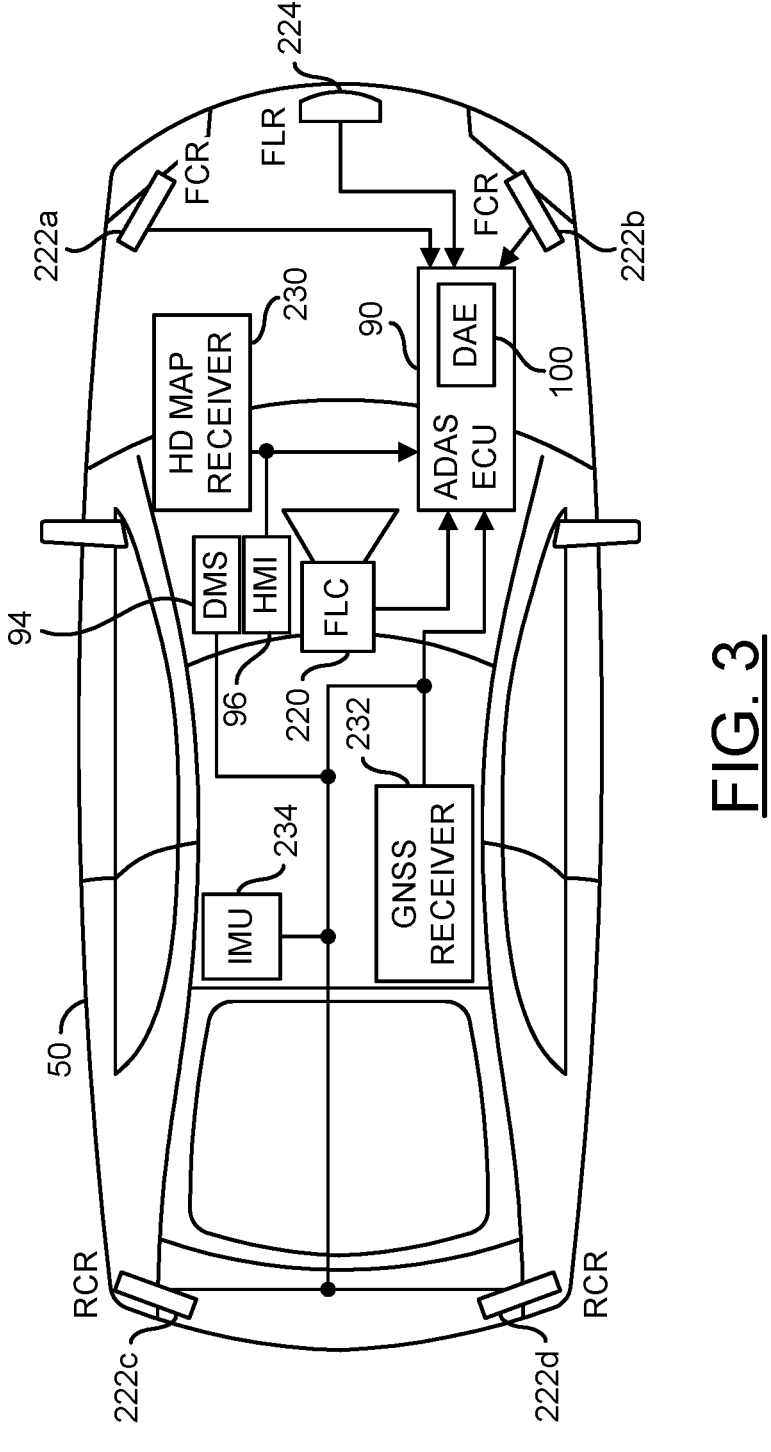
FIG. 3 is a diagram illustrating an implementation of an advanced driver-assistance systems (ADAS) feature control including an awareness checker in accordance with an example embodiment of the present invention.

Referring to FIG. 3, a diagram is shown illustrating an implementation of the system 100 in accordance with an example embodiment of the invention. In an example, the apparatus (or system) 100 may be mounted totally within, or at least partially within a vehicle 50. In an example, the system (or apparatus) 100 may be implemented as part of an advanced driver-assistance systems (ADAS) electronic control unit (ECU) 90. In various embodiments, the system 100 implementing the driver attentiveness estimator (DAE) 102 may be implemented within the ADAS ECU 90 of the vehicle 50. The ADAS ECU 90 may be connected to the vehicle platform 92 of the vehicle 50. The vehicle 50 may include the driver monitoring system (DMS) 94, the human machine interface (HMI) 96, a forward looking camera (FLC) 220, a number of corner radar sensors 222a-222d, a number of front side radar sensors (not shown), a forward looking radar (FLR) sensor 224, a high-definition (HD) map receiver 230, a global navigation satellite system (GNSS) receiver 232, and an inertial measurement unit (IMU) 234. In some embodiments, the vehicle 50 may also include LIDAR sensors and/or sonar sensors (not shown).

The forward looking camera (FLC) 220 is generally used to detect and identify objects and road features in front of the vehicle 50. In an example, the forward looking camera (FLC) 220 may be configured to provide stereoscopic vision with a 100-degree field of view (FOV). In an example, the forward looking camera (FLC) 220 may be used to detect road markings (e.g., lane markings, etc.), road signs, traffic lights, structures, etc. The corner radar sensors 222a-222d and the forward looking radar (FLR) sensor 224 (and LIDAR and/or sonar sensors when present) are generally used to detect and track objects. In an example, each of the corner radar sensors 222a-222d may have a 140-degree FOV. In an example, the forward looking radar sensor (FLR) 224 may have two FOVs, an 18-degree FOV for long-range sensing and a 90-degree FOV for short range sensing. The IMU 234 generally reports the orientation, angular velocity and acceleration, and forces acting on the vehicle 50.

In an example, the DMS 94, the HD map receiver 230, the GNSS receiver 232, the FLC 220, the FCRs 222a-222b, and the FLR 224 may be connected to the system 90. In an example, the DMS 94, the HD map receiver 230, the GNSS receiver 232, the FLC 220, the FCRs 222a-222b, and the FLR 224 may be connected to the system 90 via one or more vehicle buses of the vehicle 50. In another example, the DMS 94, the HD map receiver 230, the GNSS receiver 232, the FLC 220, the FCRs 222a-222b, and the FLR 224 may be connected to the system 90 via a wireless protocol. In an example, the DMS 94 may convey driver attentiveness information to the system 90. The FLC 220 may convey surrounding road information (e.g., lane widths, marker types, lane marker crossing indications, and video) to the system 90. The GNSS receiver 232 may convey position data (e.g., latitude value, longitude value, adjustment information and confidence information) to the system 90. The HD map receiver 230 may transfer map data to the system 90.

The FLC 220 may implement an optical sensor. In various embodiments, the FLC 220 may be an optical camera. The FLC 220 is generally operational to provide the surrounding road information (or image data) to the system 90. The road information may include, but is not limited to, lane width data, marker type data, lane change indicators, and video of a roadway ahead of the vehicle 50 within the field of view of the FLC 220. In various embodiments, the FLC 220 may be a color camera. The color may be useful for distinguishing between solid-yellow lane markers (e.g., leftmost lane markers) from solid-white lane markers (e.g., rightmost lane markers). In various embodiments, the FLC 220 may provide an estimated lane width for at least a current lane in the center of the field of view of the FLC 220. In some embodiments, the FLC 220 may provide estimated lane widths for the lane(s) neighboring the center lane. In other embodiments, the FLC 220 may provide estimated lane widths for all of the lanes within the field of view of the FLC 220. The lane widths may be determined using standard image recognition methods and standard analysis methods implemented in the FLC 220. The FLC 220 may also identify all lane markers within the field of view of the FLC 220. When the FLC 220 crosses over a lane marker, the FLC 220 may notify the system 90 that a lane change is occurring. Identification of the lane markers and the lane changes may be determined using standard image recognition methods and standard analysis methods implemented in the FLC 220. The FLC 220 may transfer the road information to the system 90 via a vehicle bus or a wireless protocol.

One or more other types of sensors may be used in conjunction with the FLC 220. Example sensors may include, but are not limited to, radar sensors, light detection and ranging (LiDAR) sensors, inertial sensors, thermal imaging sensors, and/or acoustic sensors. Some of the sensors may detect objects on the side of the road to provide estimations of a left boundary and a right boundary of the road. From the left boundary and the right boundary, a width of the road may be calculated. From the calculated width, an estimation of how many lanes probably fit within the width may be made based on a standard lane width. Thereafter, the sensors may estimate the current lane that the vehicle 50 occupies based on the relative distances of the sensors on the vehicle 50 to the left boundary and the right boundary of the road and the estimated number of lanes. Lane crossovers may be determined by the sensors based on the estimated numbers of lanes and changes in the relative distances to the left boundary and/or the right boundary.

The system 90 may implement a control circuit (e.g., an electronic control unit). The system 90 is generally operational to keep track of the current lane that the vehicle 50 occupies and correct the current position of the vehicle 50 to a center of the current lane. The tracking may be based on the satellite position data received in the GNSS receiver 232, the map data received from the HD map receiver 230, and the road information received in the vision detections from the FLC 220 and the radar detections received from the FCRs 222a-222b and the FLR 224. The satellite position data may include an adjustment value and a corresponding confidence value.

The GNSS receiver 232 may implement a satellite-navigation device. In various embodiments, the GNSS receiver 232 may include a Global Positioning System (GPS) receiver. Other types of satellite-navigation devices may be implemented to meet the design criteria of a particular application. The GNSS receiver 232 is generally operational to provide the latitude data and the longitude data of the vehicle 50 based on the GNSS signals received from a number of satellites. The GNSS receiver 232 may also be operational to adjust the latitude data and the longitude data based on the adjustment value and a corresponding confidence value received from the system 90. The confidence value may have a range from zero (e.g., unreliable) to one (e.g., reliable). If the confidence value is above a high threshold (e.g., >0.7), the GNSS receiver 232 may correct the latitude data and the longitude data per the adjustment value. If the confidence value is below a low threshold (e.g., <0.3), the GNSS receiver 232 may ignore the adjustment value. If the confidence value is between the high threshold and the low threshold, the GNSS receiver 232 may apply a correction to both the latitude data and the longitude data that is a linear weighting based on the degree of confidence.

The HD map receiver 230 may implement a radio-frequency receiver. The HD map receiver 230 may be operational to receive the map data from an antenna (not shown). The map data may be converted to a digital form and presented to the system 90.

Referring to FIGS. 4-12, diagrams are shown illustrating example interactions between a driver and a driver aware-ness checking system in accordance with an embodiment of the invention. In an example, the AC 114 may be configured as described above in connection with FIGS. 1 and 2. In an example, the AC 114 may be configured to monitor the output of the attention monitor 110. In an example, the AC 114 may be configured to provide mind-on-task assessments of the driver that may be utilized by the attention monitor 110 and/or the HMIM 112 to determine when to transition control back to the driver and send the vehicle into a safe stop mode in response to the driver to be sufficiently unaware to safely supervise the active automation feature.

Figure 4:
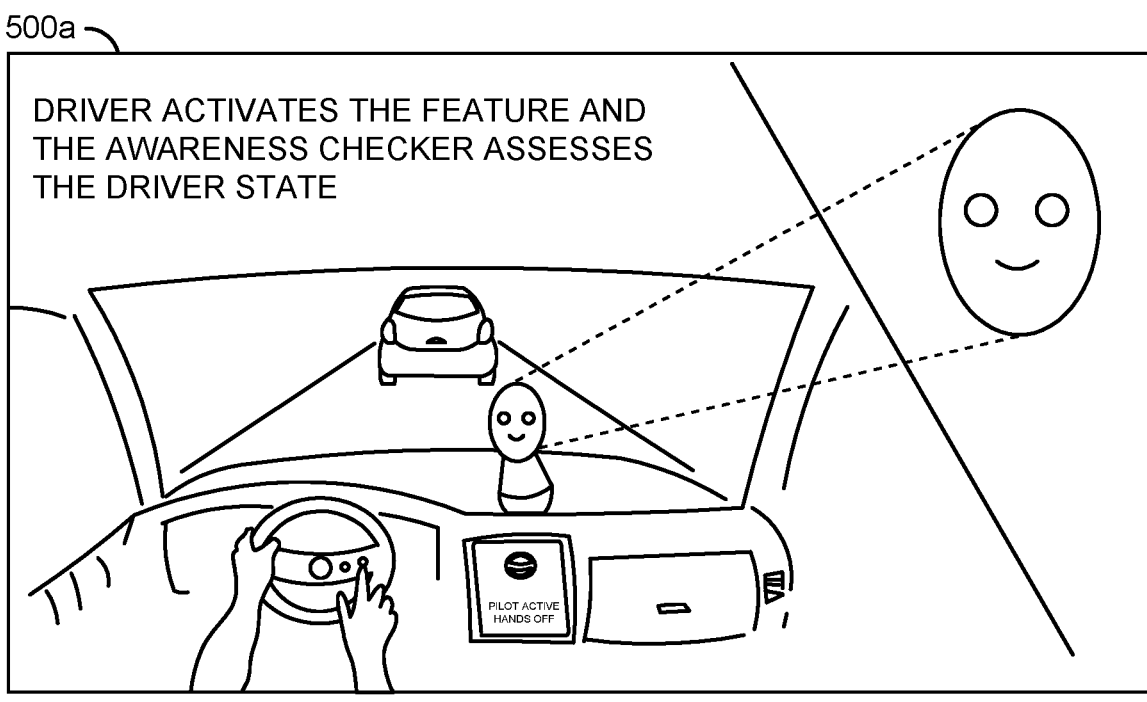
FIGS. 4-12 are diagrams illustrating example interactions between a driver and a system in accordance with an example embodiment of the invention.

Referring to FIG. 4, a diagram is shown illustrating the awareness checker (AC) 114 when the automation feature is being activated. A picture 500a is shown illustrating a view within a cockpit (or cabin or passenger compartment) of a vehicle from the perspective of the driver. In an example, the driver activates the automation feature (e.g., pushing a button on the steering wheel hub, the dash, etc.). In response to the automation feature being activated the AC 114 assesses the state of the driver (e.g., using the signal AWARENESS LEVEL).

Figure 5:
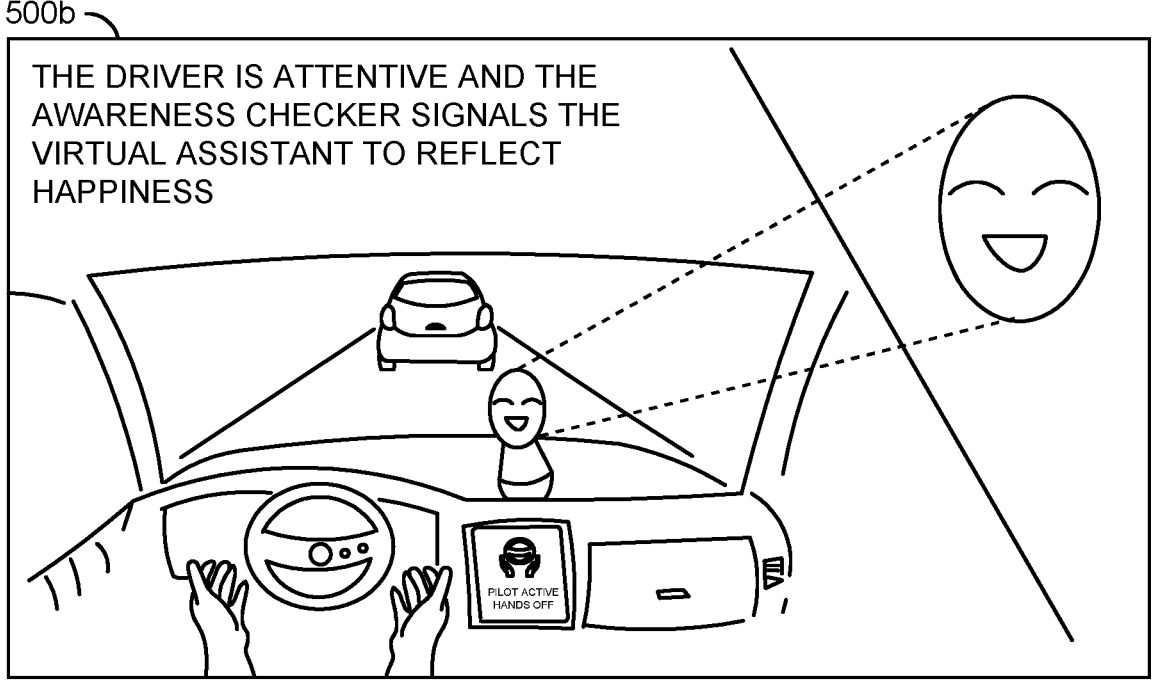

Referring to FIG. 5, a diagram is shown illustrating the AC 114 when the automation feature is activated. A picture 500b is shown illustrating a view within a cockpit of a vehicle from the perspective of the driver. The driver is driving hands-free with the ADAS feature remaining active on the highway. When the awareness checker 114 deter-mines the driver is attentive, the awareness checker 114 signals the virtual assistant to reflect a state of happiness. In an example, the reflection of happiness may be implemented as a smiling face avatar on a display of the HMI 96. In another example, the happiness state may be indicated by a color of the avatar (e.g., green for happiness). In another example, the happiness state may be displayed across the cabin of the vehicle using ambient light, audio, etc.

Figure 6:
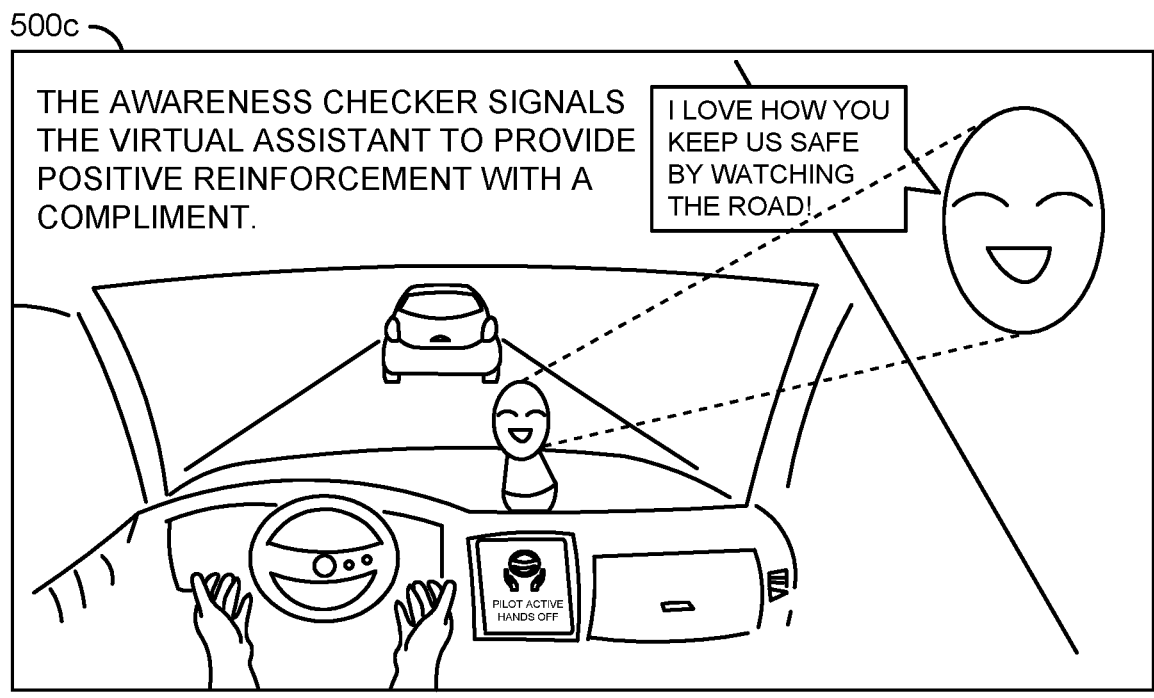

Referring to FIG. 6, a diagram is shown illustrating the AC 114 proactively checking the awareness of the driver through positive reinforcement. A picture 500c is shown illustrating the view within the cockpit of the vehicle from the perspective of the driver. In an example, the awareness checker 114 may signal the virtual assistant to provide positive reinforcement (e.g., with a compliment). In response, the virtual assistant may use speakers of an audio system of the vehicle to give the driver a message such as "I love how you keep us safe by watching the road," "you are good at keeping a safe distance from other vehicles," etc. Other messages may be implemented accordingly.

Figure 7:
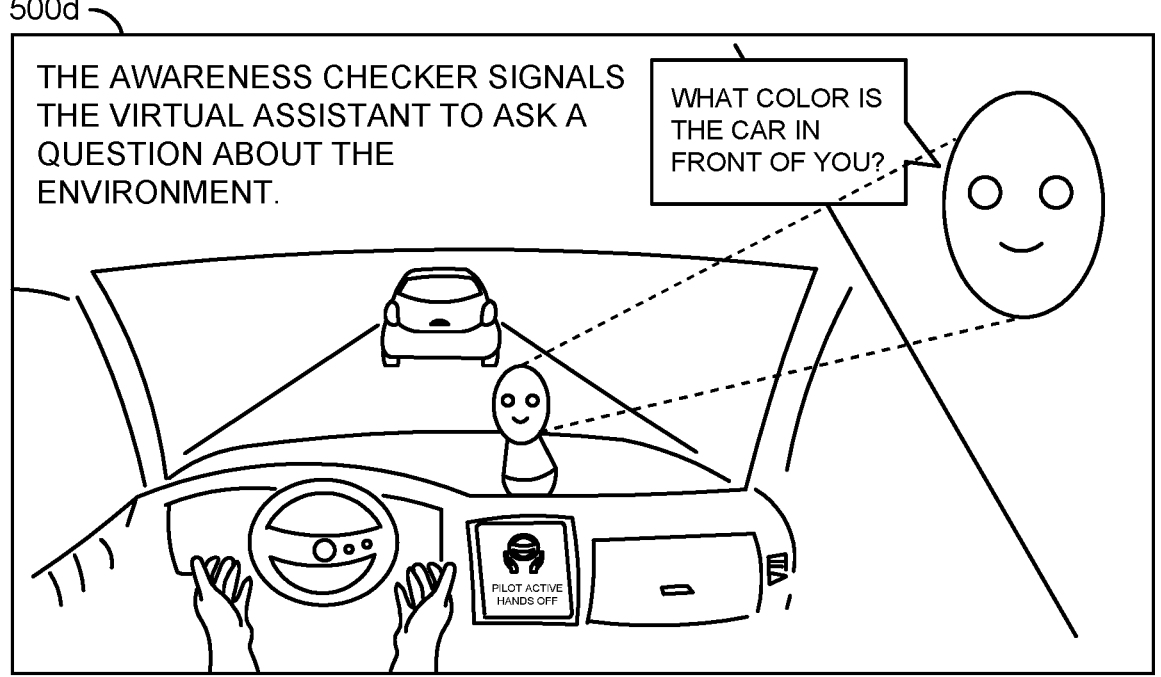

Referring to FIG. 7, a diagram is shown illustrating the AC 114 proactively checking the awareness of the driver through inquiry. A picture 500d is shown illustrating the view within the cockpit of the vehicle from the perspective of the driver. In an example, the awareness checker 114 may periodically signal the virtual assistant to ask a question about the environment of the vehicle. In response, the virtual assistant may use the speakers of the audio system of the vehicle to ask a question such as "What color is the car in front of you?"

Figure 8:
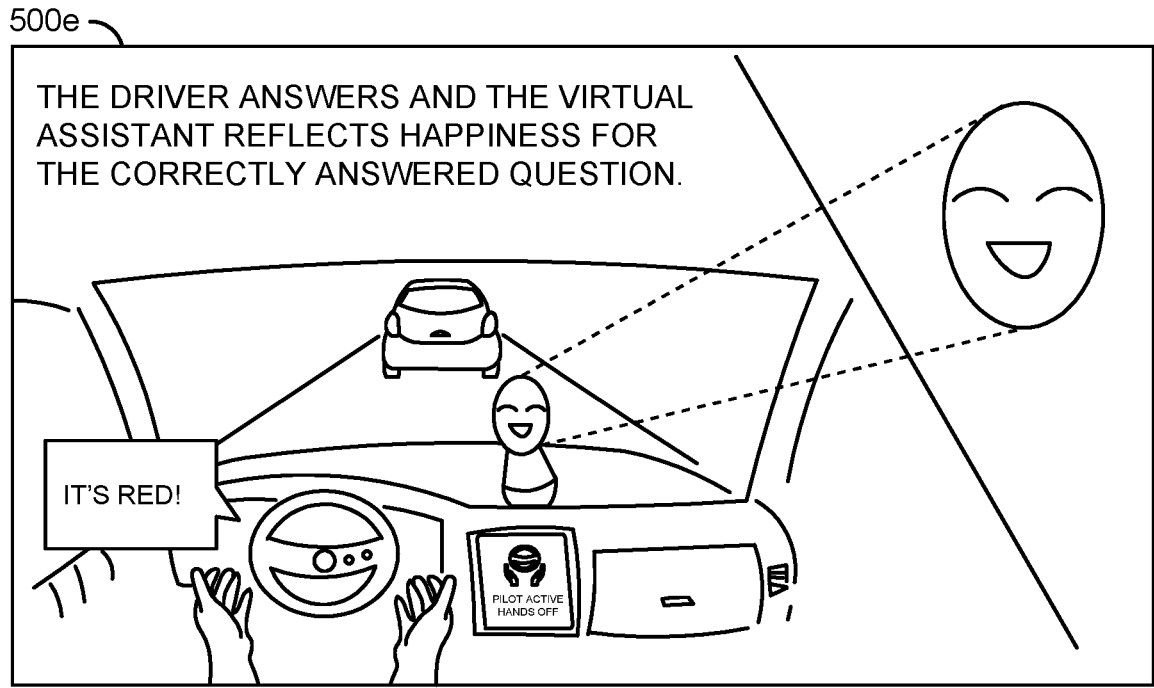

Referring to FIG. 8, a diagram is shown illustrating the AC 114 assessing the awareness of the driver based on a response of the driver to a question. A picture 500e is shown illustrating the view within the cockpit of the vehicle from the perspective of the driver. In an example, the driver answers the question presented by the virtual assistant correctly. In an example, the virtual assistant may reflect happiness for the correctly answered question (e.g., by continuing to present a smiling avatar face on the display, etc.).

Figure 9:
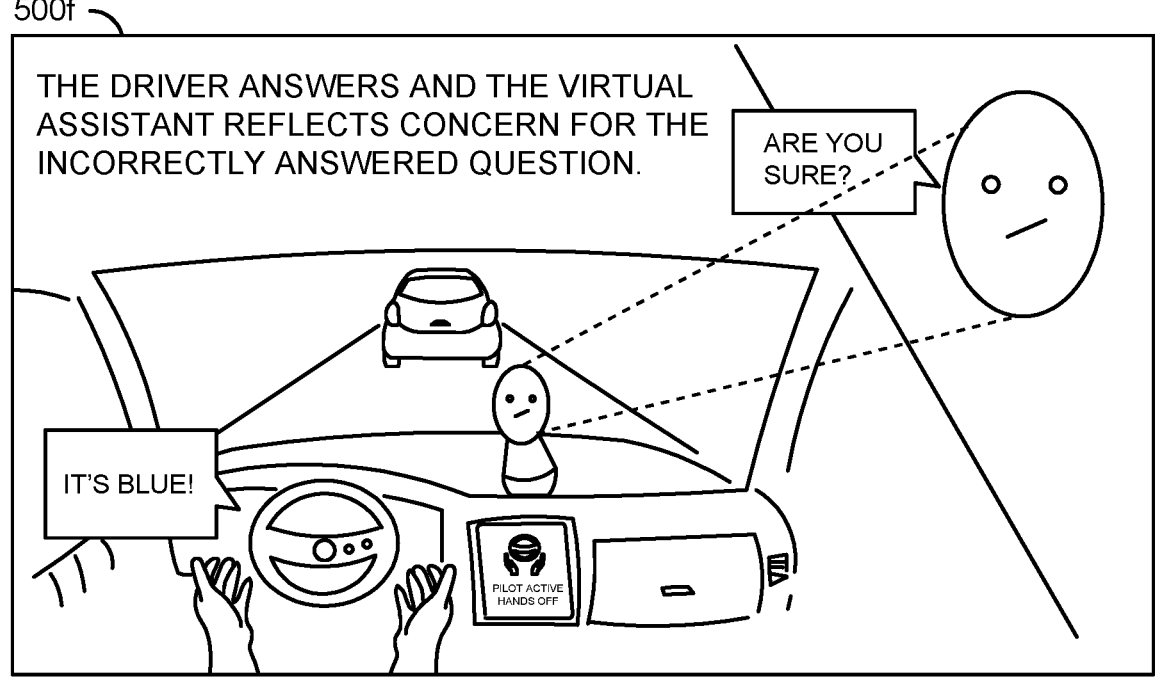

Referring to FIG. 9, a diagram is shown illustrating the AC 114 assessing the awareness of the driver based on a response of the driver to a question. A picture 500f is shown illustrating the view within the cockpit of the vehicle from the perspective of the driver. In an example, the driver may answer the question presented by the virtual assistant incor-rectly. In an example, when the driver answers incorrectly the virtual assistant may reflect a state of concern for the incorrectly answered question by showing a caution state. In an example, the caution state may be exhibited by presenting the avatar having a concerned expression. In another example, the caution state may be indicated by changing a color of the avatar (e.g., to yellow). In an example, the virtual assistant may use speakers of an audio system of the vehicle to ask the driver a follow up question such as "Are you sure?" or "Are we looking at the car in front of us?".

Figure 10:
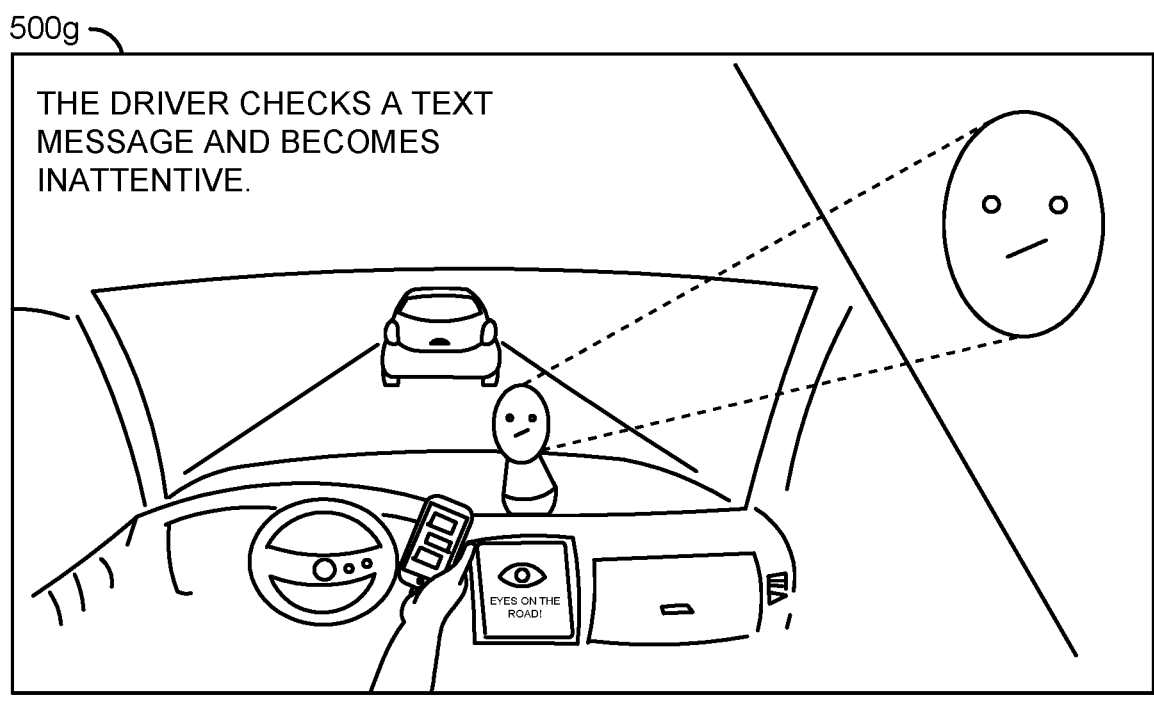

Referring to FIG. 10, a diagram is shown illustrating the AC 114 detecting the driver being inattentive. A picture 500g is shown illustrating the view within the cockpit of the vehicle from the perspective of the driver. In an example, the driver may be driving hands-free with the ADAS feature remaining active on the highway. In an example, the driver may check a text message and becomes inattentive. In the picture 500h, a display on the dash that is part of the HMI 96 may alert the driver to pay attention to the road. In response to the driver being inattentive, the virtual assistant may reflect the caution state.

Figure 11:
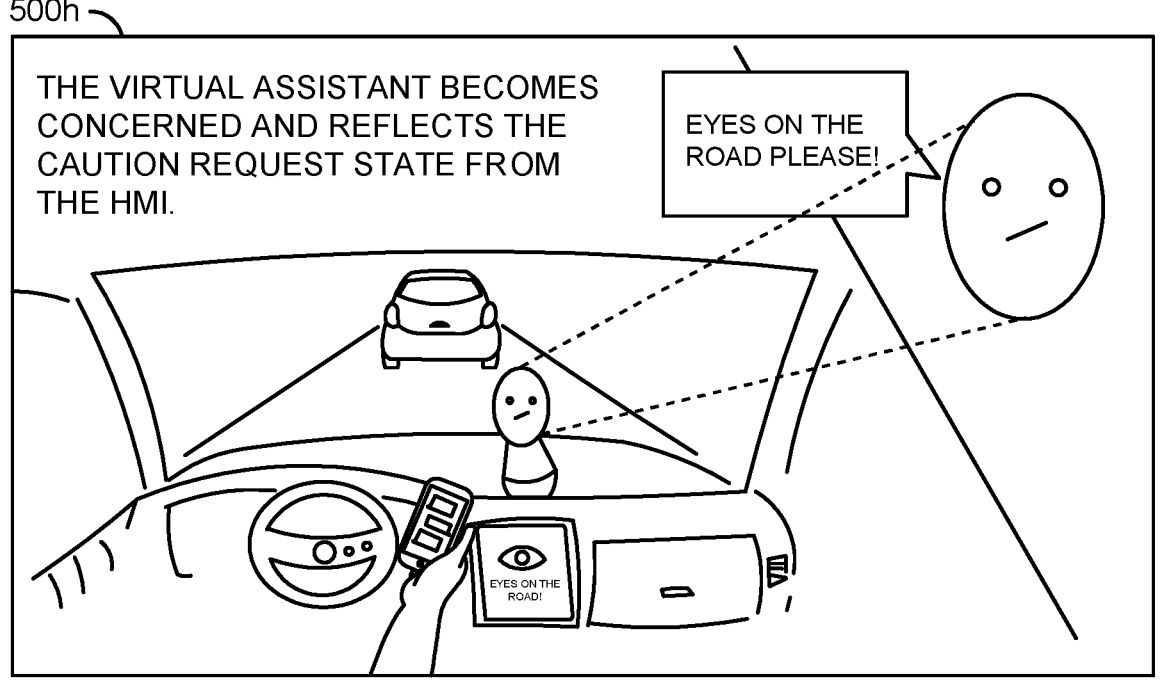

Referring to FIG. 11, a diagram is shown illustrating the AC 114 detecting the driver being inattentive. A picture 500h is shown illustrating the view within the cockpit of the vehicle from the perspective of the driver. In the picture 500h, a display on the dash that is part of the HMI 96 alerts the driver to pay attention to the road. In an example, the AC 114 may work in cooperation with the HMIM 112 to restore the attention of the driver to the task at hand. In an example, the virtual assistant may reflect the caution request state presented via the HMI 96 using the display. In an example, the virtual assistant may also use the speakers of the audio system of the vehicle to give the driver the message "Eyes on the road please!".

Figure 12:
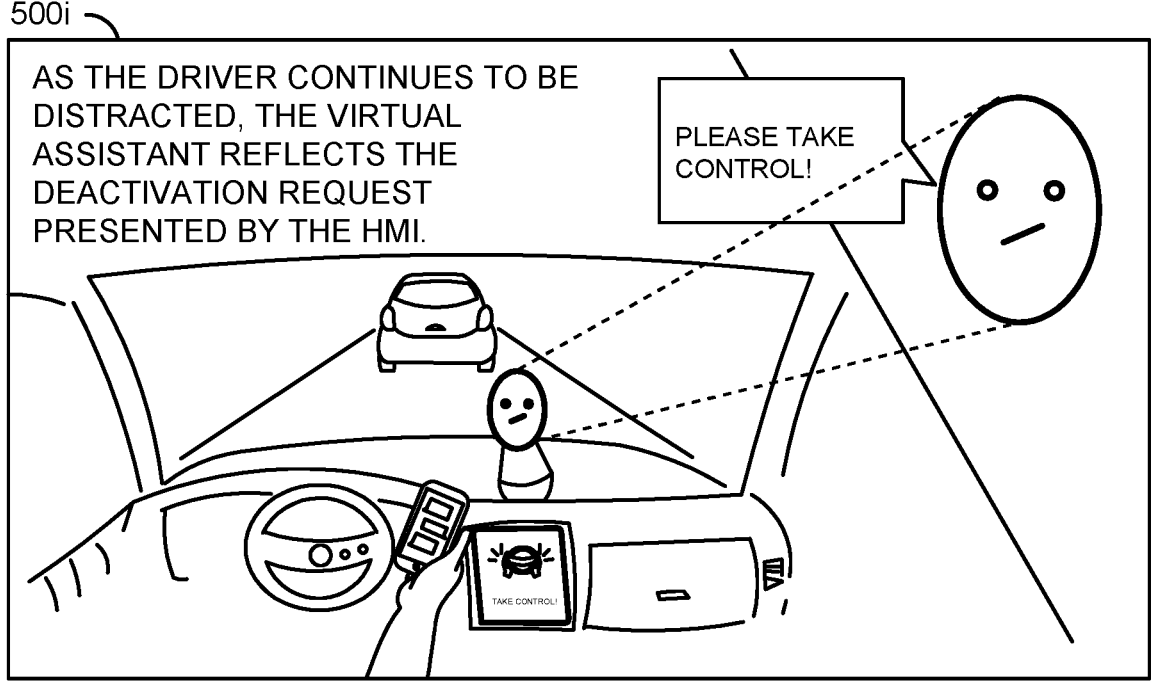

Referring to FIG. 12, a diagram is shown illustrating the AC 114 after determining the driver has continued to be distracted. A picture 500i is shown illustrating the view within the cockpit of the vehicle from the perspective of the driver. In an example, the display on the dash that is part of the HMI 96 may be used by the attention monitor 110 and/or the HMIM 112 to alert the driver to take control of the vehicle. In embodiments where the awareness checker 114 operates in cooperation with the attention monitor 110 and/or the HMIM 112, the virtual assistant may reflect the deactivation request presented by the HMI 96. In an example, the virtual assistant may reflect concern and use the speakers of the audio system of the vehicle to give the driver the message "Please Take Control!" The deactivation request state may also be exhibited by changing the color of the personal assistance avatar (e.g., to red). The vehicle may begins to decelerate to 5 kph.

In general, the AC 114 may provide notification of the mind-on-task status of the driver by using the signal DRIVER-MIND-ON_TASK STATUS. When the AC 114 determines that the driver is paying attention, the AC 114 may set the signal DRIVER-MIND-ON_TASK STATUS to reflect happiness with the awareness level of the driver. When the AC 114 determines that the driver does not appear to be staying aware of their supervisory task, the AC 114 may provide notification by set the signal DRIVER-MIND-ON_TASK STATUS to a state other than happiness. In some embodiments, the AC 114 may implement an escalation scheme in the levels presented by the signal DRIVER-MIND-ON_TASK STATUS (e.g., happiness (green), concern (yellow), heightened concern (red), etc.).

In some embodiments, the attention monitor 110 and/or the HMIM 112 may utilize the signal DRIVER-MIND-ON_TASK STATUS in assessing the sufficiency of awareness exhibited by the driver. In an example, the attention monitor 110 may be configured to move between an aware state to a temporarily unaware state based on the signal DRIVER MIND-ON-TASK STATUS. In an example, the HMIM 112 may track transitions in the levels of the signal DRIVER MIND-ON-TASK STATUS and make an assessment based on a respective threshold. The attention monitor 110 and/or the HMIM 112 may then initiate a request that the driver take over operation of the vehicle and safely discontinue the automation feature when the awareness (or attention) level is considered insufficient for the particular automation feature. Because discontinuing activity of the automation feature at high speed may be unsafe as well, particularly when the driver is known to not be aware, the HMI 96 may be used to present a request for the driver to take over operation of the vehicle. In an example, the attention monitor 110 and/or the HMIM 112 may facilitate a safe transition by slowly degrading operation of the automation feature to a safe state (e.g., decelerating to a safe speed and/or a safe stop) before completely discontinuing collaborative operation. However, other strategies for discontinuing collaborative operation may be implemented to meet design criteria of a particular situation or application.

Figure 13:
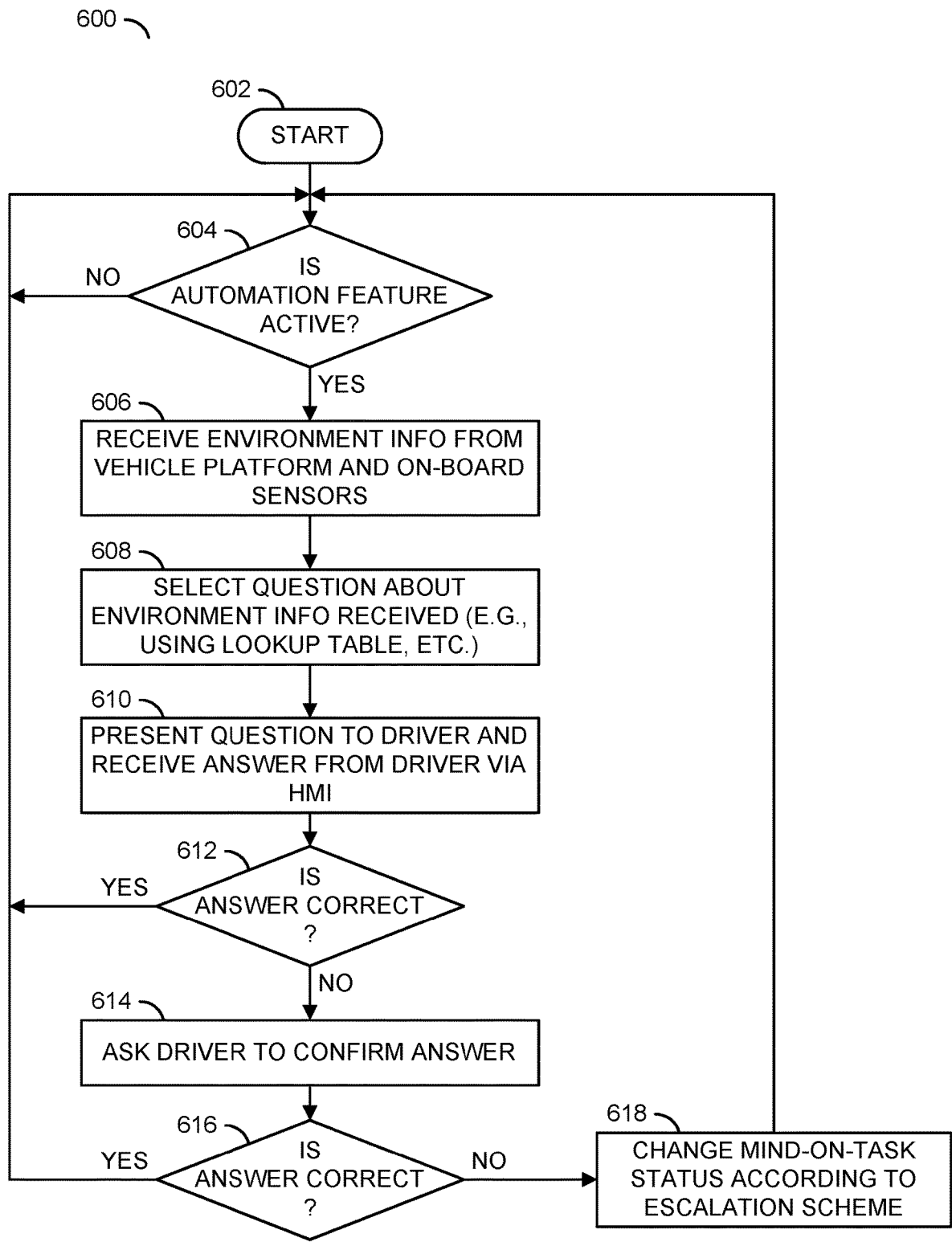
FIG. 13 is a diagram illustrating an awareness checking process in accordance with an example embodiment of the invention.

Referring to FIG. 13, a flow diagram is shown illustrating an example awareness checking process in accordance with an embodiment of the invention. In an example, a method (or process) 600 may be implemented to proactively maintain the driver in a continuously aware state. In an example, the method 600 may be implemented by the awareness checker 114. In an example, the method 600 may use positive reinforcement or reward techniques. In an example, the method 600 may comprise a step (or state) 602, a step (or state) 604, a decision step (or state) 606, a step (or state) 608, a step (or state) 610, a step (or state) 612, a step (or state) 614, a decision step (or state) 616, a step (or state) 618. The method 600 may begin in the step 602 and move to the decision step 604.

In the decision step 604, the method 600 may determine whether an automation feature (e.g., auto pilot, adaptive cruise control, hyper traffic jam assistance, etc.) has been activated. In an example, the method 600 may subscribe to the signal AWARENESS LEVEL to determine whether the driver is considered to be in an aware state by the attention monitor 110. When an automation feature has not been activated or the drive is not considered to be in the aware state, the method 600 may remain in the decision step 604. When an automation feature has been activated and the drive is considered to be in the aware state, the method 600 may move to the step 606.

In the step 606, the method 600 may acquire environmental information about the surroundings of the vehicle and conditions within the vehicle. In an example, the method 600 may utilize information about the external world in proximity of the vehicle as perceived by environmental sensors (e.g., cameras, radars, a wireless communication transceiver, an inertial measurement unit, a high-definition map, satellite signal receiver, etc.) and/or the status of the vehicle inside the cabin as perceived by in-cabin sensors (e.g., cameras, radars, HVAC sensors, etc.). In an example, the environmental information may be stored in a memory of an electronic control unit (ECU) for reference as needed. In an example, the acquisition of the environmental information may be a continuous process while the automation feature is active.

In the step 608, the method 600 may be configured to maintain the driver in the aware state by asking the driver questions about the external world in proximity of the vehicle as perceived by environmental sensors and/or the status of the vehicle inside the cabin as perceived by in-cabin sensors. In an example, the method 600 may determine the specific contents of the questions based on the available information on hand from the various sensors (e.g., from the vehicle platform 92 and the environmental monitoring systems 98). In an example, the method 600 may be configured to dynamically change the question asked based on the available information. For example, the awareness checker 114 cannot ask about a weather condition unless the awareness checker 114 has environmental information regarding the current weather status (e.g., from the internet, cameras with a view of the exterior of the vehicle, etc.). When the vehicle is lacking connection to the internet, the awareness checker 114 may ask questions related to roadside objects or traffic signs, which may be validated against the information provided by perception or localization modules of the feature control module 100. When the method 600 has selected a question to ask the driver, the method 600 may move to the step 610.

In the step 610, the method 600 may present the selected question and wait for a response from the driver. In an example, the awareness checker 114 may be configured to utilize a the human machine interface (HMI) 96 of the vehicle to communicate the question to the driver and receive an answer to the question from the driver. In an example, the awareness checker 114 may be configured to use speakers of a radio or an infotainment system of the vehicle to ask the question. In an example, the awareness checker 114 may be configured to use a microphone of the vehicle platform or infotainment system of the vehicle to receive the answer to the question. When an answer to the question is received, the method 600 may move to the decision step 612.

In the decision step 612, the method 600 may determine whether the answer received from the driver matches the information about the external world in proximity of the vehicle as perceived by the environmental sensors and/or the status of the vehicle inside the cabin as perceived by in-cabin sensors. When the answer from the driver substantially matches the information about the external world in proximity of the vehicle and/or the status of the vehicle inside the cabin, the method 600 may return to the step 604. When the answer from the driver does not match the information about the external world in proximity of the vehicle and/or the status of the vehicle inside the cabin, the method 600 may move to the step 614.

In various embodiments, the awareness checker 114 may be configured generally to use positive reinforcement or reward techniques rather than punishment. In the step 614, the method 600 may calmly ask the driver a followup question (e.g., to confirm the answer, etc.) rather than reacting negatively (e.g., deactivating the feature, correcting the driver, etc.) to an answer that is perceived to be incorrect. When a response is received from the driver, the method 600 may move to the decision step 616.

In the decision step 616, the method 600 may determine whether the followup answer received from the driver matches the information about the external world in proximity of the vehicle as perceived by the environmental sensors and/or the status of the vehicle inside the cabin as perceived by in-cabin sensors. When the answer from the driver substantially matches the information about the external world in proximity of the vehicle and/or the status of the vehicle inside the cabin, the method 600 may return to step 604. When the answer from the driver still does not match the information about the external world in proximity of the vehicle and/or the status of the vehicle inside the cabin, the method 600 may move to the step 618. In the step 618, the method 600 may change a value of a mind-on-task status maintained by the awareness checker 114 according to a defined escalation scheme. The process 600 may then return to the step 604.

Depending on the configuration of the attention monitor 110 and/or the human machine interaction monitor (HMIM) 112, the change in value of a mind-on-task status may be used by the attention monitor 110 and/or the HMIM 112 to may be used to affect the kinesthetics and longitudinal control of the vehicle platform 92 (e.g., according to respective escalation schemes of the attention monitor 110 and the HMIM 112).

Figure 14:
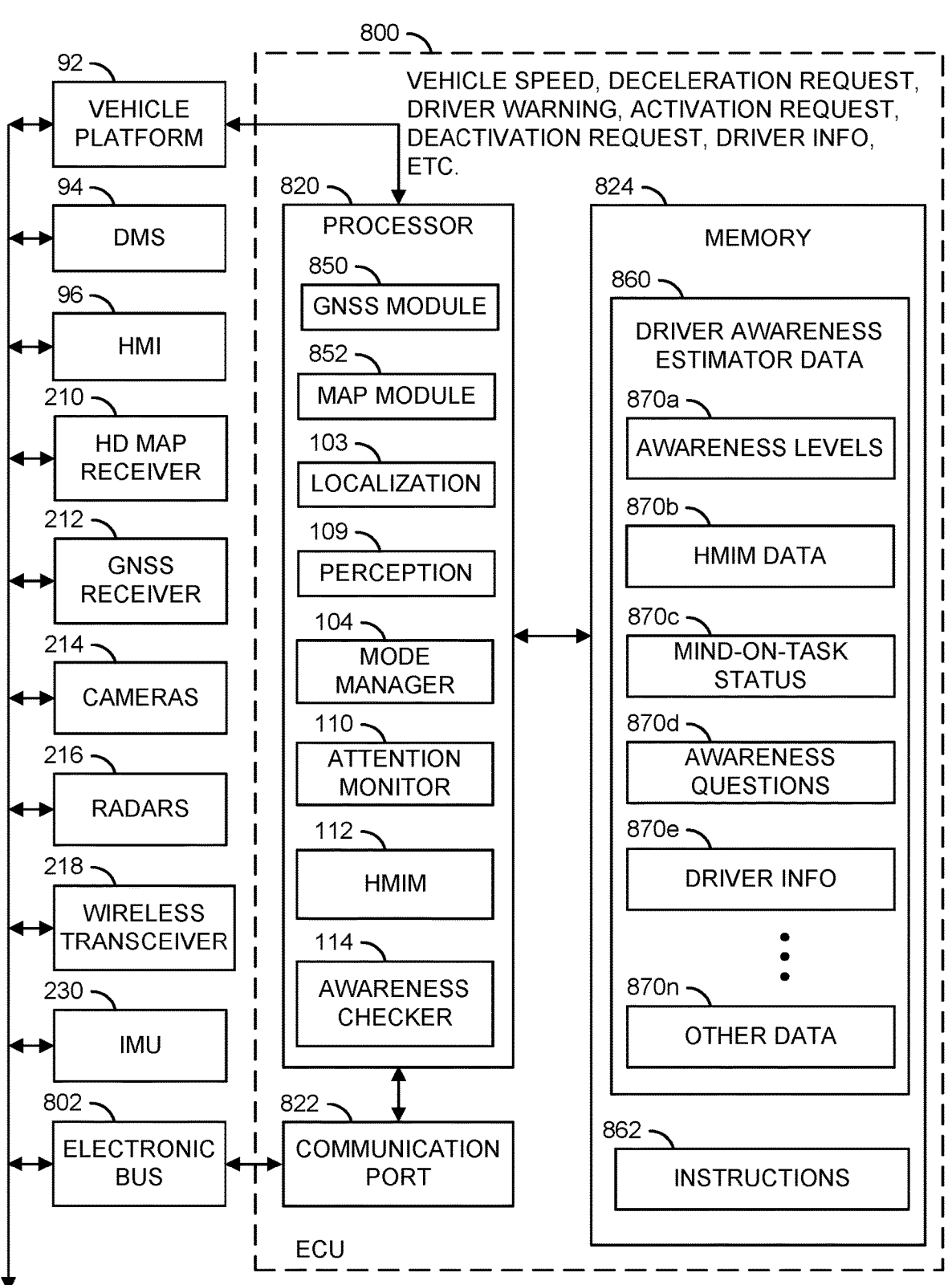
FIG. 14 is a diagram illustrating an electronic control unit implementing an advanced driver-assistance systems (ADAS) feature control system in accordance with an example embodiment of the invention.

Referring to FIG. 14, a diagram illustrating an electronic control module implementing an advanced driver-assistance systems (ADAS) feature control system in accordance with an example embodiment of the invention is shown. In an example, an apparatus 800 may implement an electronic control unit or module (ECU). In an example, the electronic control module (ECU) 800 may be implemented as a domain controller (DC). In another example, the ECU 800 may be implemented as an active safety domain master (ASDM). In various embodiments, the ECU 800 may be configured to control activation of one or more features (or functions) of an ADAS component of a vehicle. In various embodiments, the function control 100 may be implemented within the ECU 800.

In an example, the ECU 800 may be connected to the vehicle platform 92, the driver monitoring system (DMS) 94, the human machine interface (HMI) 96, and the environmental monitoring systems (EMS) 98. In an example, the environmental monitoring systems (EMS) 98 may comprise the HD map receiver 210, the GNSS receiver 212, the cameras 214, the radar sensors 216, a wireless communication transceiver 218, the inertial monitoring unit (IMU) 230, and an electronic bus 802 of the vehicle. In an example, the ECU 800 may be configured to (i) receive the signals VEHICLE SPEED, DEACTIVATION REQUEST, ACTIVATION REQUEST, DRIVER RESPONSE, and DRIVER INFO from the vehicle systems and (ii) communicate the signals DECELERATION REQUEST, QUESTIONS TO DRIVER, DRIVER MIND-ON-TASK STATUS, and DRIVER WARNING to the systems of the vehicle.

In an example, the ECU 800 may be connected to a block (or circuit) 802. The circuit 802 may implement an electronic bus of the vehicle. The electronic bus 802 may be configured to transfer data between the ECU 800 and the vehicle platform 92, the DMS 94, the HMI 96, the HD map receiver 210, the GNSS receiver 212, the cameras 214 (e.g., the forward looking camera (FLC) 220) and corner viewing, side viewing and/or rear viewing cameras), the radars 216 (e.g., corner/side radar sensors 222a-222n, the forward looking radar (FLR) sensor 224, etc.), the wireless communication transceiver 218, and the inertial measurement unit 230. In some embodiments, the electronic bus 802 may be implemented as a vehicle Controller Area Network (CAN) bus. The electronic bus 802 may be implemented as an electronic wired network and/or a wireless network (e.g., Wi-Fi, BLUETOOTH, ZIGBEE, etc.). Generally, the electronic bus 802 may connect one or more components of the vehicle 50 to enable a sharing of information in the form of digital signals (e.g., a serial bus, an electronic bus connected by wiring and/or interfaces, a wireless interface, etc.).

The ECU 800 generally comprises a block (or circuit) 820, a block (or circuit) 822, and a block (or circuit) 824. The circuit 820 may implement a processor. The circuit 822 may implement a communication port. The circuit 824 may implement a memory. Other blocks (not shown) may be implemented (e.g., filters, clocks/timers, I/O ports, power connectors, interfaces, etc.). The number and/or types of circuits implemented by the module 800 may be varied according to the design criteria of a particular implementation.

The processor 820 may be implemented as a microcontroller, a multi-thread microprocessor, or any combination thereof. The processor 820 may comprise a block (or circuit) implementing the localization module 103, a block (or circuit) implementing the mode manage 104, a block (or circuit) implementing the perception module 109, a block (or circuit) implementing the attention monitor 110, a block (or circuit) implementing the human machine interaction monitor 112, a block (or circuit) implementing the awareness checker 114, a block (or circuit) 850 implementing a GNSS module, and/or a block (or circuit) 852 implementing a map module. In an example, the map module 852 may implement the map interface 105. The processor 820 may comprise other components such as a filter and a clock (not shown). In some embodiments, the processor 820 may be a combined (e.g., integrated) chipset implementing processing functionality.

In some embodiments, the processor 820 may be comprised of a number of separate circuits (e.g., a microcontroller, a multi-thread microprocessor, a digital signal processor (DSP), a graphics processing unit (GPU), etc.). The design of the processor 820 and/or the functionality of various components of the processor 820 may be varied according to the design criteria of a particular implementation. The processor 820 is shown sending data to and/or receiving data from the vehicle platform 92, the communication port 822, and/or the memory 824. However, the processor 820 may be configured to implement additional data and/or control paths to meet design criteria of a particular application.

In an example, the memory 824 may comprise a block (or circuit) 860 and a block (or circuit) 862. The block 860 may store data utilized by the driver awareness (or attentiveness) estimator (DAE) 102 and the mode manager 104. The block 862 may store computer readable instructions (e.g., instructions readable by the processor 820). In an example, the DAE data 860 may store various data sets 870$a$-870$n$. In an example, the data set 870$a$ may be utilized by the attention monitor 110 to store awareness states (or levels). For example, the data set 870$a$ may keep track of transitions to the temporarily unaware state, the unaware state, and the out-of-loop state. In an example, the data set 870$b$ may be utilized by the human machine interaction monitor (HMIM) 112 to store an attentiveness state (or level), a long-term glance distribution, a count of transitions to the temporarily unaware state, a count of transitions to the unaware state, a count of transitions to the out-of-loop state, etc. In an example, the data set 870$c$ may be utilized by the awareness checker 114 to store driver mind-on-task status. In an example, the data set 870$d$ may be utilized by the awareness checker 114 to store a lookup table or database of questions that may be used to query the driver. In an example, the data set 870$e$ may be utilized to store driver information that may be used by the HMIM 112 and the awareness checker 114. The memory 824 may also be configured to store other data sets 870$n$ (e.g., environmental data, etc.).

In an example, the other data sets 870$n$ may comprise parameters (e.g., coefficients) and/or calibration data used to transform data received from the various sensors (e.g., FLC, FLR, FCR, FCS, IMU, etc.) of the vehicle. In an example, the calibration data 870$n$ may provide many sets of coefficients (e.g., one set of coefficients for each of the sensors). The calibration data 870$n$ may be updatable. For example, the calibration data 870$n$ may store current values as coefficients for the sensors and as the data from the sensors drifts the module 800 may update the calibration data 870$n$ in order to maintain accuracy. The format of the calibration data 870$n$ may vary based on the design criteria of a particular implementation.

Various other types of data may be stored in the data set 870$n$ as part of the DAE data 860. For example, the other data 870$n$ may store glance distributions for a plurality of drivers. For example, the other data 870$n$ may store past data values of the calibration data and/or current data values of the calibration data. The past and current data values of the calibration data may be compared to determine trends used to extrapolate and/or predict potential future values for the calibration data.

The processor 820 may be configured to execute stored computer readable instructions (e.g., the instructions 862 stored in the memory 824). The processor 820 may perform one or more steps based on the stored instructions 862. In an example, steps of the instructions 862 may be executed/performed by the processor 820 and may implement one or more of the attention monitor 110, the human machine interaction monitor 112, the awareness checker 114, the localization module 103, the map interface 105, the perception module 109, and the mode manager 104. The instructions executed and/or the order of the instructions 862 performed by the processor 820 may be varied according to the design criteria of a particular implementation.

The communication port 822 may allow the module 800 to communicate with external devices such as the vehicle platform 92, the driver monitoring system 94, the human machine interface 96, and the environmental monitoring systems 98. For example, the module 800 is shown connected to the external electronic bus 802. In an example, information from the module 800 may be communicated to an infotainment device for display and/or presentation to a driver. In another example, a wireless connection (e.g., Wi-Fi, BLUETOOTH, cellular, etc.) to a portable computing device (e.g., a smartphone, a tablet computer, a notebook computer, a smart watch, etc.) may allow information from the module 800 to be displayed and/or otherwise communicated (e.g., aurally, etc.) to a user.

In some embodiments, the ECU 800 may further comprise a filter and a clock. The filter may be configured to perform a linear quadratic estimation. For example, the filter may implement a Kalman filter. Generally, the filter may operate recursively on input data to produce a statistically optimal estimate. For example, the filter may be used to calculate the position coordinates and/or estimate the accuracy of the position coordinates utilized by the GNSS module 850 and the map module 852. In some embodiments, the filter may be implemented as a separate module. In some embodiments, the filter may be implemented as part of the memory 824 (e.g., the stored instructions 862). The implementation of the filter may be varied according to the design criteria of a particular implementation. The clock may be configured to determine and/or track a time. The time determined by the clock may be stored as a time stamp in the other data 870$n$. In some embodiments, the clock may be configured to compare time stamps received from the GNSS receiver 212.

The module 800 may be configured as a chipset, a system on chip (SoC) and/or a discrete device. For example, the module 800 may be implemented as an electronic control unit (ECU). In some embodiments, the module 800 may be configured to control activation of one or more ADAS features/functions.

Given the lack of state-of-the-art ASIL on HMI warning messages, an underlying objective of the HMIM 112 and the AC 114 in accordance with an embodiment of the invention is to provide a monitoring functionality that ensures the sufficient controllability of a supervising driver to possible hazardous events. In an example, the HMIM 112 and the AC 114 may achieve sufficient controllability by ensuring driver engagement. In an example, the HMIM 112 and the AC 114 may ensure driver engagement by monitoring glance distribution patterns and driver mind-on task status as a measure of attentiveness. In various embodiments, a few example functionality iterations of the HMIM 112 and the AC 114 may be implemented to mitigate false positives during decision making.

In one example, the HMIM 112 may check the delta change in eye glance shift pre and post HMI warnings to determine whether the warning is being conveyed to the driver and to safeguard against omission of HMI messages. For example, the HMIM 112 may subscribe to a signal indicating "eyes on road" in real time from a camera of the driver monitoring system 94. The signal indicating "eyes on road" may be used as feedback to quickly evaluate whether there is improvement in glance distribution after each escalation warning. If not, the HMIM 112 may fail safe appropriately.

In another example, the HMIM 112 may intentionally try to take the eyes of the driver off the road momentarily when the attention monitor 110 reports the driver being in the "aware" state for a longer duration than expected to safeguard against false positive from the camera of the DMS 94 and attention monitor attention levels. When the driver has been reported to be "aware" for the longer time duration, the HMIM 112 may send directed prompts to divert attention of the driver away from the road (e.g., when judged to be safe to do so by subscribing to environmental information from onboard sensors, GNSS, HD map, etc.) and verify whether the front-end signal chain (e.g., DMS 94, attention monitor 110, awareness checker 114, etc.) detect the diverted attention. If not, the HMIM 112 may fail safe appropriately.

In another example, other cabin sensory information may be integrated into the HMIM 112 and the AC 114 as inputs to form a holistic driver state estimation. In addition to eyes on road information, the HMIM 112 and the AC 114 may subscribe to hands on steering wheel, pedal information, seat sensors, seat belt status, etc. to form a holistic driver state estimation model. The HMIM 112 and the AC 114 may leverage feedback from each of these inputs to detect and mitigate inattentiveness.

In still another example, the HMIM 112 and the AC 114 may be developed with artificial intelligence/machine learning (AI/ML) based non-deterministic algorithms to baseline a driver attentiveness profile for each individual driver and track inattentiveness against the baseline of the particular driver. In various embodiments, each vehicle may implement a generic HMIM 112 and the AC 114 that over time may customize themselves by tracking and learning about an inattentiveness profile of the driver by baselining the inattentiveness profile of the driver against the glance distribution of the same driver during manual driving. Inattentiveness during supervised driving may then be flagged when the inattentiveness exceeds the threshold noted during prior manual driving.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
a memory; and
at least one processor communicatively coupled to the memory and configured to:
receive a first signal that comprises sensor-based information from a plurality of sensors from a vehicle platform of a vehicle;
receive a second signal that comprises environmental information of an environment of the vehicle from an environment monitoring system of the vehicle comprising at least one camera configured to capture, at least in part, the environment of the vehicle;
receive a third signal that comprises driver information of a driver of the vehicle from a driver monitoring system comprising at least one camera configured to capture, at least in part, the driver of the vehicle;

detect an attention state of the driver based on the first signal, the second signal, and the third signal;
generate a first control signal based on the attention state, and transmit the first control signal to a human machine interaction system of the vehicle, the first control signal causing the human machine interaction system to display a first image to the driver of the vehicle;
based on the display of the first image, receive a fourth signal that comprises additional driver information from the driver monitoring system; and
based on a comparison of the additional driver information and the environmental information indicating the attention state of the driver is insufficient for an automation feature of an automation system of the vehicle, generate a second control signal, and transmit the second control signal to the automation system of the vehicle, the second control signal causing the automation system to transition operation of the vehicle from a state of the automation system to the driver.

2. The apparatus according to claim 1, wherein:
the first signal comprises one or more of vehicle speed, ignition status, window and door locks status, tire pressure, or HVAC status;
the second signal comprises one or more of radar detections or vision detections, the environmental information comprising one or more of objects and other vehicles present around the vehicle, types of objects and other vehicles around the vehicle, landmarks, traffic signals, road signs, or weather condition; and
the third signal comprises eyes on road status of the driver.

3. The apparatus according to claim 1, wherein the at least one processor is configured to (i) generate the first control signal communicating the attention state of the driver and (ii) generate the second control signal communicating an assessment of whether the driver is sufficiently attentive for the automation system to safely continue to operate the vehicle.

4. The apparatus according to claim 3, wherein the at least one processor is configured to:
determine the attention state of the driver during a first window having a first duration and generate the first control signal based on the attention state;
generate an assessment of whether the driver is sufficiently attentive during a second window having a second duration and generate the second control signal based on the assessment; and
determine whether a perception of the driver of the environment of the vehicle corresponds with the environmental information and the sensor-based information, and generate a third control signal communicating an assessment of an awareness status of the driver based on the perception.

5. The apparatus according to claim 4, wherein the at least one processor is configured to determine the attention state of the driver is one of a plurality of driver awareness states, and compare the attention state with the awareness status to generate the third control signal.

6. The apparatus according to claim 5, wherein:
said plurality of driver awareness states comprise one or more of an aware state, a temporarily unaware state, an unaware state, or an out-of-the-loop state; and
the awareness status comprises one or more of a satisfied state, a caution state, or a deactivation request state.

7. The apparatus according to claim 6, wherein the at least one processor is further configured to determine the attention state of the driver is one of the plurality of driver awareness states based on a respective threshold.

8. The apparatus according to claim 7, wherein when the perception of the driver differs from the environmental information and the sensor-based information by a predefined threshold, the at least one processor is further configured to transition operation of the vehicle to the driver and discontinue the automation system of the vehicle.

9. The apparatus according to claim 8, wherein the at least one processor is configured to activate or maintain operation of the automation system of the vehicle when the predefined threshold is not exceeded and transfer operation of the vehicle from the automation system to the driver when the predefined threshold is exceeded.

10. The apparatus according to claim 7, wherein the respective threshold for each of the plurality of driver awareness states are programmable.

11. The apparatus according to claim 4, wherein the at least one processor is further configured to generate the awareness status of the driver a plurality of times over a temporal period to generate a plurality of awareness statuses, and generate an awareness profile of the driver based on the plurality of awareness statuses.

12. The apparatus according to claim 3, wherein the at least one processor is configured to generate a third control signal, and transmit the third control signal to a speaker of the vehicle, the third control signal causing the speaker to communicate with the driver about the environment of the vehicle.

13. The apparatus according to claim 12, wherein the at least one processor is configured to:

generate the third control signal to cause the speaker to communicate questions about a perception of the environment of the vehicle;

receive a response that comprises answers received from the driver;

compare the response with the environmental information and the sensor-based information; and generate the second control signal based on comparing the response with the environmental information and the sensor-based information.

14. The apparatus according to claim 1, wherein the first image comprises a warning to the driver to take over control of the vehicle, and wherein the at least one processor is configured to degrade a performance of an autopilot function of the automation system.

15. A method by at least one processor of controlling an automation system of a vehicle comprising:

receiving a first signal that comprises sensor-based information from a plurality of sensors from a vehicle platform of a vehicle;

receiving a second signal characterizing environmental information of an environment of the vehicle from an environment monitoring system of the vehicle comprising at least one camera configured to capture, at least in part, the environment of the vehicle;

receiving a third signal characterizing driver information of a driver of the vehicle from a driver monitoring system comprising at least one camera configured to capture, at least in part, the driver of the vehicle;

detecting an attention state of the driver based on the first signal, the second signal, and the third signal;

generating a first control signal based on the attention state, and transmit the first control signal to a human machine interaction system of the vehicle, the first control signal causing the human machine interaction system to display a first image to the driver of the vehicle;

based on the display of the first image, receiving a fourth signal characterizing additional driver information from the driver monitoring system; and based on a comparison of the additional driver information and the environmental information indicating the attention state of the driver is insufficient for an automation feature of an automation system of the vehicle, generating a second control signal, and transmit the second control signal to the automation system of the vehicle, the second control signal causing the automation system to transition operation of the vehicle from a state of the automation system to the driver.

16. The method according to claim 15, wherein the method comprises: (i) generating the first control signal communicating the attention state of the driver, (ii) generating the second control signal communicating an assessment of whether the driver is sufficiently attentive for the automation system to safely continue to operate the vehicle, and (iii) querying the driver about the environment of the vehicle.

17. The method according to claim 16, further comprising:

determining the attention state of the driver during a first window having a first duration and generating the first control signal based on the attention state;

generating an assessment of whether the driver is sufficiently attentive during a second window having a second duration and generating the second control signal based on the assessment; and determining whether a perception of the driver of the environment of the vehicle corresponds with the environmental information and the sensor-based information, and generating a third control signal communicating an assessment of an awareness status of the driver based on the perception.

18. The method according to claim 17, further comprising:

determining the attention state of the driver is one of a plurality of driver awareness states; and comparing the attention state with the awareness status to generate the third control signal.

19. The method according to claim 15, wherein the first image comprises a warning to the driver to take over control of the vehicle, the method further comprising degrading a performance of an autopilot function of the automation system.

20. A non-transitory computer-readable medium comprising instructions that, when executed by at least one processor, cause the at least one processor to:

receive a first signal that comprises sensor-based information from a plurality of sensors from a vehicle platform of a vehicle;

receive a second signal that comprises environmental information of an environment of the vehicle from an environment monitoring system of the vehicle comprising at least one camera configured to capture, at least in part, the environment of the vehicle;

receive a third signal characterizing driver information of a driver of the vehicle from a driver monitoring system comprising at least one camera configured to capture, at least in part, the driver of the vehicle;

detecting an attention state of the driver based on the first signal, the second signal, and the third signal;

generate a first control signal based on the attention state, and transmit the first control signal to a human machine interaction system of the vehicle, the first control signal causing the human machine interaction system to display a first image to the driver of the vehicle;

based on the display of the first image, receive a fourth signal characterizing additional driver information from the driver monitoring system; and based on a comparison of the additional driver information and the environmental information indicating the attention state of the driver is insufficient for an automation feature of an automation system of the vehicle, generating a second control signal, and transmit the second control signal to the automation system of the vehicle, the second control signal causing the automation system to transition operation of the vehicle from a state of the automation system to the driver.

* * * * *